US008578801B2

(12) United States Patent
Gumpoltsberger et al.

(10) Patent No.: US 8,578,801 B2
(45) Date of Patent: Nov. 12, 2013

(54) LOAD-SHIFTABLE PARALLEL SHIFT TRANSMISSION AND DOUBLE CLUTCH TRANSMISSION

(75) Inventors: Gerhard Gumpoltsberger, Friedrichshafen (DE); Matthias Reisch, Ravensburg (DE); Ralf Dreibholz, Meckenbeuren (DE); Mark Mohr, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 711 days.

(21) Appl. No.: 12/739,224

(22) PCT Filed: Oct. 13, 2008

(86) PCT No.: PCT/EP2008/063704
§ 371 (c)(1),
(2), (4) Date: Apr. 22, 2010

(87) PCT Pub. No.: WO2009/056435
PCT Pub. Date: May 7, 2009

(65) Prior Publication Data
US 2011/0036186 A1 Feb. 17, 2011

(30) Foreign Application Priority Data
Oct. 30, 2007 (DE) .......................... 10 2007 000 595

(51) Int. Cl.
*F16H 3/08* (2006.01)
(52) U.S. Cl.
USPC .............................................. 74/331; 74/330
(58) Field of Classification Search
USPC ..................... 74/330, 331, 340, 665 F, 665 G
See application file for complete search history.

(56) References Cited

U.S. PATENT DOCUMENTS

| 4,685,343 | A | 8/1987 | Ehrlinger et al. |
| 5,718,148 | A * | 2/1998 | Bender ........................... 74/325 |
| 6,209,407 | B1 | 4/2001 | Heinzel et al. |
| 6,250,171 | B1 * | 6/2001 | Sperber et al. .................. 74/331 |
| 6,634,247 | B2 * | 10/2003 | Pels et al. ........................ 74/329 |
| 7,124,659 | B2 * | 10/2006 | Gumpoltsberger et al. .... 74/331 |

(Continued)

FOREIGN PATENT DOCUMENTS

| DE | 44 44 120 C1 | 5/1996 |
| DE | 198 21 164 A1 | 11/1999 |
| DE | 198 60 251 C1 | 11/2000 |
| DE | 103 16 070 A1 | 10/2003 |

(Continued)

*Primary Examiner* — Ha D Ho
*Assistant Examiner* — Jude Agendia
(74) *Attorney, Agent, or Firm* — Davis & Bujold, PLLC; Michael J. Bujold

(57) ABSTRACT

A power shift parallel shift transmission with parallel torque transmission branches, the input sides of which have an intermediate element which can be connected by an associated power shift element to a common input element, and the output sides of which can be connected by drive output elements with a common output element and can be connected to the appropriate intermediate element by a transmission ratio step that is engaged by an associated clutch. The transmission ratio steps are sequentially distributed in alternation in the order of their transmission ratios across the intermediate elements and in groups of adjacent transmission ratios across the drive output elements. To simply increase the number of gear steps in a space-saving manner, at least one of the drive output elements is in driving connection with the common output element via at least two alternatively shiftable output transmission ratio steps that have different transmission ratios.

28 Claims, 8 Drawing Sheets

(56) References Cited

U.S. PATENT DOCUMENTS

| | | | |
|---|---|---|---|
| 7,287,442 B2* | 10/2007 | Gumpoltsberger | 74/331 |
| 7,694,605 B2* | 4/2010 | Fujimoto et al. | 74/473.36 |
| 7,757,578 B2* | 7/2010 | Shintani et al. | 74/337.5 |
| 8,166,842 B2* | 5/2012 | Rieger | 74/330 |
| 8,342,048 B2* | 1/2013 | Rieger | 74/330 |
| 2004/0162180 A1* | 8/2004 | Tsberger et al. | 475/331 |
| 2006/0169078 A1* | 8/2006 | Hiraiwa | 74/331 |
| 2007/0277633 A1* | 12/2007 | Burgardt et al. | 74/331 |
| 2009/0173175 A1* | 7/2009 | Thery | 74/331 |

FOREIGN PATENT DOCUMENTS

| | | |
|---|---|---|
| DE | 102 32 831 A1 | 2/2004 |
| DE | 102 32 835 A1 | 2/2004 |
| DE | 103 05 241 A1 | 9/2004 |
| DE | 10 2006 024 053 A1 | 11/2007 |
| DE | 10 2006 054 271 A1 | 6/2008 |
| EP | 1 013 965 A2 | 6/2000 |
| FR | 2 830 299 A1 | 4/2003 |
| JP | 2-275148 A | 11/1990 |
| WO | 85/01335 A1 | 3/1985 |
| WO | 2008/058974 A3 | 5/2008 |

* cited by examiner

LOAD-SHIFTABLE PARALLEL SHIFT TRANSMISSION AND DOUBLE CLUTCH TRANSMISSION

This application is a National Stage completion of PCT/EP2008/063704 filed Oct. 13, 2008, which claims priority from German patent application serial no. 10 2007 000 595.6 filed Oct. 30, 2007.

FIELD OF THE INVENTION

The invention concerns a power shift parallel manual transmission in general with a plurality of parallel torque-transmission branches, each of which is formed on the input side by one of a plurality of intermediate elements each of which can be connected by means of an associated power shift element to a common input element, and on the output side by one of a plurality of drive output elements each of which can be connected to the appropriate intermediate element by means of a transmission ratio step that can be engaged by an associated clutch, the output elements having a driving connection to a common drive output element, such that the transmission ratio steps are distributed in alternation in the sequence of their transmission ratios across the intermediate elements and in groups of adjacent transmission ratios across the output elements.

The invention concerns in particular a double clutch transmission with two parallel torque-transmission branches, each of which is formed on the input side by one of two intermediate shafts each of which can be connected by means of an associated friction clutch to a common input shaft, and on the output side by one of at least two countershafts each of which can be connected to the appropriate intermediate shaft by at least one transmission ratio step that can be engaged by an associated clutch, and which is in driving connection with a common output element, such that the intermediate shafts are preferably arranged coaxially with one another and the transmission ratio steps are distributed in alternation in the sequence of their transmission ratios across the intermediate shafts and in pairs of adjacent transmission ratios across the countershafts.

BACKGROUND OF THE INVENTION

In parallel power shift transmissions, which can in general be constructed in any desired technical form, torque is transmitted between an input element and an output element alternately via one or another of the respective parallel torque-transmitting branches present. In this, the change of torque transmission from a first torque-transmission branch to a second torque-transmission branch when a transmission ratio is engaged in each, takes place by time-overlapped disengagement of the power shift element associated with the first torque-transmission branch and engagement of the power shift element associated with the second torque-transmission branch, and therefore without any interruption of the traction force. To be able to carry out sequential shifts, i.e. shifts between transmission ratio steps with adjacent transmission ratios, as load shifts, i.e. without traction force interruption, the transmission ratio steps are preferably distributed in alternation in the sequence of their transmission ratios between intermediate elements. To achieve compact dimensions of the parallel shift transmission the transmission steps, expediently in groups of adjacent transmission ratios, are alternately in driving connection with a plurality of drive output elements or can be connected thereto. If the number of transmission ratio steps available is to be increased in accordance with the current development trend, then the number of transmission ratio steps per intermediate element and/or per drive output element or the number of parallel torque-transmission branches would have to be correspondingly increased, but disadvantageously, this would result in larger dimensions, higher weight and a more complex structure of the parallel shift transmission.

A known load-shiftable parallel shift transmission with two parallel torque-transmission branches is a double clutch transmission which, with a structure that is particularly axially compact and therefore especially well-suited for transverse mounting of the drive unit in a vehicle, comprises two coaxially arranged intermediate shafts and two countershafts arranged axis-parallel thereto. In a double clutch transmission of this type the intermediate shafts can each be connected on the input side, by means of an associated friction clutch such as a dry clutch or a wet-operating disk clutch, to a common input shaft and on the output side, by a plurality of gear steps, each of which can be shifted by means of an associated clutch such as a synchronized or unsynchronized claw clutch, in alternating association with the two countershafts. The countershafts can for example be in driving connection via in each case an output constant formed of two fixed gearwheels, such as an axle differential of a drive axle close to the transmission or a cardan shaft leading to an axle differential of a drive axle far from the transmission. To achieve an axially short structural length of the double clutch transmission, the gearwheels of the gears forming at least one pair of gear steps, which are associated with a common intermediate shaft and in each case one other of the two countershafts, can be arranged in a common gearwheel plane and can have a common fixed gearwheel arranged on the intermediate shaft concerned.

A first double clutch transmission of this type is known for example from DE 198 21 164 A1. In this double clutch transmission the odd-numbered gear steps (1.G, 3.G, 5.G) are associated with a central, first intermediate shaft and the even-numbered gear steps (2.G, 4.G, 6.G) with a second intermediate shaft made as a hollow shaft and arranged coaxially around the first intermediate shaft. The double clutch transmission has five gearwheel planes in which the gearwheels of the six gear steps are arranged. The gearwheels of the fourth gear step (4.G) and the sixth gear step (6.G) are arranged in a common gearwheel plane and have a common fixed gearwheel which is arranged in a rotationally fixed manner on the second intermediate shaft. The idler gearwheel of the fourth gear step (4.G), as also the idler gearwheels of the first, second and third gear steps (1.G, 2.G, 3.G), are arranged to rotate on a first countershaft and can be engaged by associated gear clutches, whereas the idler gearwheel of the sixth gear step (6.G), as also the idler gearwheel of the fifth gear step (5.G), are arranged to rotate on a second countershaft and can be engaged by an associated gear clutch. The two countershafts, together with the two coaxial intermediate shafts, form a compact, V-shaped shaft arrangement and are each in driving connection via a fixed drive output wheel with a common output element, such as an axle differential of a drive axle close to the transmission. The gear clutches associated with the idler gearwheels arranged on the countershafts are largely brought together in pairs in shifting packets.

Another double clutch transmission of this type is described in DE 198 60 251 C1. In this known double clutch transmission the odd-numbered gear steps (I, III, V) are associated with a central, first intermediate shaft and the even-numbered gear steps (II, IV, VI) with a second intermediate shaft made as a hollow shaft and arranged coaxially with the first intermediate shaft. As a special feature, the double clutch transmission comprises a second gear gearset of the fourth gear step (IV*), which is associated with the first intermediate shaft. In addition, the third gear step (III, III*) can optionally be associated with the first or with the second intermediate shaft by means of an idler gearwheel mounted to rotate on the first intermediate shaft near the outer end of the second intermediate shaft, which can optionally be coupled by means of two gear clutches either to the first intermediate shaft or to the second intermediate shaft.

By virtue of the additional fourth gear step (IV*) associated with the first intermediate shaft and the optional shiftability of the third gear step (III*) by the second intermediate shaft, shift operations in which one of the two gear steps (III, III*; IV, IV*) concerned can be bypassed, can be carried out in each case as power shifts, i.e. without traction force interruption. For this purpose, however, the known double clutch transmission comprises six gearwheel planes in which the gearwheels of the gear steps (I-VI) are arranged. The gearwheels of the third gear step (III, III*) and the additional fourth gear step (IV*) are arranged in a common gearwheel plane and comprise the already mentioned idler gearwheel mounted to rotate on the first intermediate shaft. The normal idler gearwheel of the additional fourth gear step (IV*), as also the idler gearwheels of the first, second and normal fourth gear steps (I, II, IV), are arranged to rotate on a first countershaft and can be engaged by an associated gear clutch, whereas the idler gearwheel of the third gear step (III, III*), as also the idler gearwheels of the fifth and sixth gear steps (V, VI), are arranged on a second countershaft and can be engaged by an associated gear clutch.

A further double clutch transmission of this type is known from DE 103 16 070 A1. In this known double clutch transmission the odd-numbered gear steps (A1, A3, A5) are associated with a central, first intermediate shaft and the even-numbered gear steps (A2, A4, A6) with a second intermediate shaft made as a hollow shaft and arranged coaxially around the first intermediate shaft. This double clutch transmission has only four gearwheel planes, in which the gearwheels of the gear steps (A1-A6) are arranged. The gearwheels of the third gear step (A3) and of the fifth gear step (A5) are arranged in a common gearwheel plane and have a common fixed gearwheel which is arranged in a rotationally fixed manner on the first intermediate shaft. Likewise, the gearwheels of the fourth gear step (A4) and of the sixth gear step (A6) are arranged in a common gearwheel plane and have a common fixed gearwheel which is arranged in a rotationally fixed manner on the second intermediate shaft. The idler gearwheels of the third and fourth gear steps (A3, A4), as also the idler gearwheels of the first and second gear steps (A1, A2), are arranged to rotate in each case on a first countershaft and can be engaged by a respective gear clutch, whereas the idler gearwheels of the fifth and sixth gear steps (A5, A6) are rotatably supported on a second countershaft and can in each case be engaged by an associated gear clutch.

If, in accordance with the current development trend, one of the double clutch transmissions described above is to be extended by two further gear steps, this would entail extending in each case the transmission structure concerned by one or two gearwheel planes. This would on the one hand entail considerable development costs and on the other hand unfavorably increase the axial structural length of the double clutch transmission, whereby in particular transverse mounting of the drive unit consisting of the drive motor and the double clutch transmission in a vehicle would at least be made much more difficult.

To shift a relatively compact and in particular axially short power shift transmission, in DE 102 32 831 A1 and in DE 102 32 835 A1 a double clutch transmission is proposed in each case, in which each part-transmission comprises a plurality of axis-parallel countershafts. In each part-transmission a first countershaft can be connected by means of a friction clutch to a common input shaft. In each case the first countershaft can be connected to a second countershaft by two gearsets with different transmission ratios, each of which, in alternating arrangement, consists of a fixed gearwheel and an idler gearwheel that can be engaged by means of an associated clutch. The second countershaft can in each case be connected to a third countershaft via three gearsets with different transmission ratios, which in alternating arrangement each consists of a fixed gearwheel and an idler gearwheel that can be engaged by an associated clutch. The third countershafts are in each case in driving connection via an output constant with a common drive output shaft. In the double clutch transmission according to DE 102 32 831 A1 at least some of the idler gearwheels are provided with synchronizing clutches that act by friction.

Thus, these double clutch transmissions known from DE 102 32 831 A1 and DE 102 32 835 A1, while being axially short, each have a total of twelve gear steps, each gear step being obtained by shifting two serially arranged gearsets of a part-transmission. However, because of the large number of countershafts, gearsets and clutches the structure of these double clutch transmissions is very complex and with a folded shaft arrangement, also demands a radially large installation space.

SUMMARY OF THE INVENTION

Owing to the above-described disadvantages of the known power shift transmissions a first objective of the present invention is to propose a load-shifting parallel shift transmission of the type mentioned to begin with, which comprises as many gear steps as possible while having a simple and space-saving structure.

A second objective is to propose a specific power shift double clutch transmission of the type mentioned earlier, which comprises as many gear steps as possible while having a simple and space-saving structure.

Thus, the invention first starts from a power shift parallel shift transmission with a plurality of torque transmission branches, each formed on the input side by one of a plurality of intermediate elements each of which can be connected by an associated load-shifting element to a common input element, and on the output side by one of a plurality of drive output elements each of which can be connected, via at least one transmission ratio step that can be shifted by means of an associated clutch, to the appropriate intermediate element and which are in driving connection with a common output element, the transmission ratio steps being distributed in the sequence of their transmission ratios alternately on the intermediate elements and in groups of adjacent transmission ratios on the drive output elements.

The definition according to which the transmission ratio steps are distributed in groups of adjacent transmission ratios on the drive elements does not mean that the adjacent transmission ratio steps are sequential and/or spatially, i.e. axially directly next to one another. Rather, to comply with this characteristic it suffices for adjacent transmission ratio steps to be arranged anywhere on the respective drive output element. A variant of this prior art is formed, for example, by the double clutch transmission according to DE 198 21 164 A1, in which on one countershaft (first drive output element) the gears 1.G to 4.G gear are arranged in the axial sequence 2nd gear, 4th gear, 3rd gear and 1st gear to form a first group, while on the second countershaft (second drive output element) the gears 5.G, 6.G and RG are arranged in the axial sequence reverse-gear, 6th gear and 5th gear to form a second group.

In such a transmission according to the invention these objectives are achieved when at least one of the drive output elements is in driving connection with the common output element via at least two output transmission ratio steps with different transmission ratios that can be shifted alternatively.

Accordingly, the invention starts from a power shift parallel shift transmission which comprises a plurality of parallel torque-transmitting branches. The torque-transmitting branches are each formed on the input side by one of a plurality of intermediate elements each of which can be connected by an associated power shift element to a common input element, and on the output side by one of a plurality of drive output elements each of which can be connected, via at least one transmission ratio step that can be shifted by means of an associated clutch, to the appropriate intermediate element and which are in driving connection with a common output element. On the output side these torque-transmitting branches comprise branching between a plurality of drive output elements, whose selection is determined in each case generally by the association of the transmission ratio steps concerned with the drive output elements, and specifically by the currently engaged transmission ratio step.

As already explained, the transmission ratio steps are distributed in the sequence of their transmission ratios alternately on the intermediate elements and in groups of adjacent transmission ratios on the drive output elements. Thus all sequential shifts, i.e. shifts between transmission ratio steps with adjacent transmission ratios with the respective loaded and target ratio steps engaged can be carried out in each case by time-overlapped engagement of the loaded shift element associated with the target transmission ratio step and disengagement of the loaded shift element associated with the loaded shift transmission ratio step without interruption of the traction force, and thus as shifts under load.

To increase the number of available gear steps in such a parallel shift transmission in the simplest and most space-saving manner, according to the invention it is provided that at least one of the drive output elements is in driving connection with the common output element via at least two alternatively shiftable output transmission ratio steps having different transmission ratios. By virtue of the alternatively shiftable output transmission ratio steps the transmission ratio steps associated with the drive output element concerned are converted differently, so that the number of transmission ratio steps in driving connection with the common output element via the drive output element is doubled and the number of gear steps available as a whole is correspondingly increased. The design effort and structural space required for increasing the number of gear steps in this way are minimal.

Expediently, the two output transmission ratio steps each comprise at least one fixed gearwheel and an idler gearwheel in driving connection with the fixed gearwheel and which can be engaged by an associated clutch.

Preferably, the fixed gearwheels of the two output transmission ratio steps are each arranged in a rotationally fixed manner on the common output element and the idler gearwheels of the two output transmission ratio steps are supported to rotate, respectively, on the associated drive output elements.

Alternatively, however, the fixed gearwheels of the two output transmission ratio steps can be arranged in a rotationally fixed manner on their respectively associated drive output elements, with the idler gearwheels of the two output transmission ratio steps in each case supported to rotate on the common output element and able to be coupled to it.

To save structural space and simplify an associated shift actuation device, the clutches of the idler gearwheels of the two output transmission ratio steps are expediently combined in a common shifting packet.

Preferably, the transmission ratios of the two output transmission ratio steps differ in such manner that the overall transmission ratios, effective in combination with one engaged output transmission ratio step, of the transmission ratio steps associated with the drive output element concerned, are larger than the overall transmission ratios of at least a part, corresponding to the number of intermediate elements, of the transmission ratio steps associated with the other drive output element, and the overall transmission ratios, effective in combination with the other engaged output transmission ratio step, of the transmission ratio steps associated with the drive output element concerned, are smaller than the overall transmission ratios of the part concerned of the transmission ratio steps associated with the other drive output element.

By such a gradation of the transmission ratios, the principle of a range group of a range-change transmission is transferred to the drive output branch of the parallel shift transmission determined by the drive output element concerned, so that the thereby-formed groups of gear steps in this output branch include the respective part of the gear steps which are in driving connection with the common output element via the other drive output element, in relation to their overall transmission ratios. A further result is that the force flow of torque transmission takes place in increasing sequence of the gear steps, alternately by means of the first loaded shift element and the second loaded shift element, so that the power shift ability of the parallel shift transmission is maintained through sequential shifts.

Using at least some of the features according to the invention described above, a six-gear version of the parallel shift transmission with two parallel torque transmission branches is preferably configured in such manner that a shiftable first transmission ratio step (A1) is in driving connection on the input side with the first intermediate element and on the output side with the first drive output element, a shiftable third transmission ratio step (A3) is so connected on the input side with the first intermediate element and on the output side with the second drive output element, a shiftable second transmission ratio step (A2) is so connected on the input side with the second intermediate element and on the output side with the first drive output element, and a shiftable fourth transmission ratio step (A4) is so connected on the input side with the second intermediate element and on the output side with the second drive output element, and the first drive output element is in driving connection via two alternatively shiftable output transmission ratio steps (B1.1, B1.2), and the second drive output element is in driving connection via an output constant (C), in each case with the common output element.

Correspondingly, an eight-gear version of the parallel shift transmission with two parallel torque transmission branches is preferably configured in such manner that a shiftable first transmission ratio step (A1) is in driving connection on the input side with the first intermediate element and on the output side with the first drive output element, a shiftable third transmission ratio step (A3) is so connected on its input side with the first intermediate element and on its output side with the second drive output element, a shiftable second transmission ratio step (A2) is so connected on its input side with the second intermediate element and on its output side with the first drive output element, and a shiftable fourth transmission ratio step (A4) is so connected on its input side with the second intermediate element and on its output side with the second drive output element, and the first drive output element is in driving connection via two alternatively shiftable first output transmission ratio steps (B1.1, B1.2), and the second drive output element is in driving connection via two alternatively shiftable second output transmission ratio steps (B2.1, B2.2), in each case with the common output element.

In the same manner in principle, but with twice as many transmission ratio steps (A1 to A8), a twelve-gear version of the parallel shift transmission with two parallel torque transmission branches is preferably configured in such manner that a shiftable first and a shiftable third transmission ratio step (A1, A3) are in driving connection on the input side with the first intermediate element and on the output side with the first drive output element, a shiftable fifth and a shiftable seventh transmission ratio step (A5, A7) are so connected on the input side with the first intermediate element and on the output side with the second drive output element, a shiftable second and a shiftable fourth transmission ratio step (A2, A4) are so connected on the input side with the second intermediate element and on the output side with the first drive output element, and a shiftable sixth and a shiftable eighth transmission ratio step (A6, A8) are so connected on the input side with the second intermediate element and on the output side with the second drive output element, and the first drive output element is in driving connection via two alternatively shiftable output transmission ratio steps (B1.1, B1.2), and the second drive output element via an output constant (C), in each case with the common output element.

Analogously, a sixteen-gear version of the parallel shift transmission with two parallel torque transmission branches is preferably configured in such manner that a shiftable first and a shiftable third transmission ratio step (A1, A3) are in driving connection on the input side with the first intermediate element and on the output side with the first drive output element, a shiftable fifth and a shiftable seventh transmission ratio step (A5, A7) are so connected on the input side with the first intermediate element and on the output side with the second drive output element, a shiftable second and a shiftable fourth transmission ratio step (A2, A4) are so connected on the input side with the second intermediate element and on the output side with the first drive output element, and a shiftable sixth and a shiftable eighth transmission ratio step (A6, A8) are so connected on the input side with the second intermediate element and on the output side with the second drive output element, and the first drive output element is in driving connection via two alternatively shiftable first output transmission ratio steps (B1.1, B1.2), and the second drive output element via two alternatively shiftable second output transmission ratio steps (B2.1, B2.2), in each case with the common output element.

A particularly suitable configuration of a parallel shift transmission with two parallel torque transmission branches, in which the features according to the invention can be used at least in part, is the double clutch transmission known per se in which the input element is in the form of an input shaft, the power shift elements are friction clutches, the intermediate elements are intermediate shafts preferably arranged coaxially with one another, and the drive output elements are countershafts arranged axis-parallel to the intermediate shafts.

The objective related to the double clutch transmission is achieved by virtue of a double clutch transmission with two parallel torque transmission branches, each formed on the input side by one of two intermediate shafts each of which can be connected via an associated friction clutch to a common input shaft, and on the output side by one of at least two countershafts, each of which can be connected via at least one shiftable transmission ratio that can be shifted by means of an associated clutch to the appropriate intermediate shaft, and which are in driving connection with a common output element, the intermediate shafts being arranged coaxially with one another, and the transmission ratio steps being distributed in the sequence of their transmission ratios alternately on the intermediate shafts and in groups of adjacent transmission ratios on the countershafts. In addition, in this double clutch transmission according to the invention it is provided that at least one of the at least two countershafts is in driving connection with the common output element via at least two alternatively shiftable output transmission ratio steps with different transmission ratios.

The definition according to which the transmission ratio steps are distributed in groups of adjacent transmission ratios on the countershafts, does not mean that the adjacent transmission ratio steps are arranged on the countershafts sequentially and/or spatially, i.e. axially, immediately next to one another. Rather, to comply with this feature it suffices for adjacent transmission ratio steps to be arranged anywhere on the respective countershaft. A variant of this from the prior art is formed, for example, by the double clutch transmission according to DE 198 21 164 A1, in which on one of the countershafts the gears 1.G to 4.G are arranged in the axial sequence 2nd gear, 4th gear, 3rd gear and 1st gear, while on the second countershaft the gears 5.G, 6.G and RG are arranged in the axial sequence Reverse gear, 6th gear and 5th gear to form a second group.

Thus, the related invention starts from a double clutch transmission with two parallel torque transmission branches, each formed on the input side by one of two intermediate shafts each of which can be connected via an associated friction clutch (K1, K2) to a common input shaft, and on the output side by one of at least two countershafts, each of which can be connected via at least one shiftable transmission ratio (A1 to A4) that can be engaged by means of an associated clutch (S1 to S4) to the appropriate intermediate shaft, and which are in driving connection with a common output element, such as an axle differential of a drive axle close to the transmission, the intermediate shafts preferably being arranged coaxially with one another and the transmission ratio steps (A1 to A4) being distributed alternately on the countershafts in the sequence of their transmission ratios ($i_{A1}$ to $i_{A4}$) and in groups of adjacent transmission ratios ($i_{A1}$, $i_{A2}$, $i_{A3}$, $i_{A4}$).

To increase the number of available gear steps in such a double clutch transmission in the simplest and most space-saving manner possible, according to the invention it is provided that at least one of the at least two countershafts is in driving connection with the common output element via at least two, alternatively shiftable output transmission ratio steps (B1.1, B1.2; B2.1, B2.2) with different transmission ratios ($i_{B1.1}$, $i_{B1.2}$; $i_{B2.1}$, $i_{B2.2}$).

By virtue of the alternatively shiftable output transmission ratio steps (B1.1, B1.2; B2.1, B2.2) the transmission ratio steps (A1, A3; A2, A4) associated with the countershafts concerned are converted differently, so that the number of transmission ratio steps that are in driving connection with the common output element via the countershafts is doubled and the total number of available gear steps (G1 to G6) is correspondingly increased. The design effort and space occupation entailed by such an increase of the number of gear steps (G1 to G6) are minimal.

Expediently, the two output transmission ratio steps (B1.1, B1.2; B2.1, B2.2) each comprise at least one fixed gearwheel and an idler gearwheel in driving connection with the fixed gearwheel, which can be shifted by means of an associated clutch.

Preferably, the fixed gearwheels of the two output transmission ratio steps (B1.1, B1.2; B2.1, B2.2) are each arranged in a rotationally fixed manner on the common output element and the idler gearwheels of the two output transmission ratio steps (B1.1, B1.2; B2.1, B2.2) are each mounted to rotate on the associated countershaft.

Alternatively, however, it is also position for the fixed gearwheels of the two output transmission ratio steps (B1.1, B1.2; B2.1, B2.2) each to be arranged in a rotationally fixed manner on the associated countershaft, and the idler gearwheels of the two output transmission ratio steps (B1.1, B1.2; B2.1, B2.2) each to be arranged to rotate on the common output element and able to be coupled thereto.

To reduce the structural complexity and simplify control, the clutches of the idler gearwheels of the two output transmission ratio steps (B1.1, B1.2; B2.1, B2.2) are expediently combined in a common shifting packet (SB1; SB2). Such a shifting packet (SB1; SB2) has at least two shift positions, in which respectively one of the two output transmission ratio steps (B1.1, B1.2; B2.1, B2.2) is engaged. In addition, however, the shifting packet (SB1; SB2) can have a central, neutral position in which neither of the output transmission ratio steps (B1.1, B1.2; B2.1, B2.2) is engaged and the force flow between the countershaft concerned and the common output element is interrupted.

To preserve the load shifting ability of all sequential shift operations, the transmission ratios ($i_{B1.1}$, $i_{B1.2}$, $i_{B2.1}$, $i_{B2.2}$) of the two output transmission ratio steps (B1.1, B1.2; B2.1, B2.2) expediently differ in such manner that the overall transmission ratios ($i_{G1}$, $i_{G2}$; $i_{G3}$, $i_{G4}$) of the transmission ratio steps (A1, A2; A3, A4) associated with the countershaft concerned, obtained in combination with the engaged output transmission ratio step (B1.1, B2.1), are larger than the overall transmission ratios ($i_{G3}$, $i_{G4}$; $i_{G5}$, $i_{G6}$) of at least an odd-numbered part of the transmission ratio steps associated with the other countershaft, and the overall transmission ratios ($i_{G5}$, $i_{G6}$; $i_{G7}$, $i_{G8}$) of the transmission ratio (A1, A2; A3, A4) steps associated with the countershaft concerned, obtained in combination with the engaged other output transmission ratio steps (B1.2; B2.2), are smaller than the overall transmission ratios ($i_{G3}$, $i_{G4}$; $i_{G5}$, $i_{G6}$) of the part of transmission ratio steps (A3, A4; A1, A2) associated with the other countershaft.

A six-gear version of the double clutch transmission according to the invention is preferably configured in such manner that a first shiftable transmission ratio step (A1) is in driving connection on its input side with the first intermediate shaft and on its output side with the first countershaft, a shiftable third transmission ratio step (A3) is in driving connection on its input side with the first intermediate shaft and on its output side with the second countershaft, a shiftable second transmission ratio step (A2) is so connected on its input side with the second intermediate shaft and on its output side with the first countershaft and a shiftable fourth transmission ratio step is so connected on its input side with the second intermediate shaft and on its output side with the second countershaft, and the first countershaft is in driving connection with the common output element via two alternatively shiftable output transmission ratio steps (B1.1, B1.2), and the second countershaft is in driving connection with the common output element via an output constant (C).

In a similar manner, an eight-gear embodiment variant of the double clutch transmission according to the invention is preferably configured in such manner that a shiftable first transmission ratio step (A1) is in driving connection on its input side with the first intermediate shaft and on its output side with the first countershaft, a shiftable third transmission ratio step (A3) is so connected on its input side with the first intermediate shaft and on its output side with the second countershaft, a shiftable second transmission ratio step (A2) is so connected on its input side with the second intermediate shaft and on its output side with the first countershaft, and a shiftable fourth transmission ratio step (A4) is so connected on its input side with the second intermediate shaft and on its output side with the second countershaft, and the first countershaft is in driving connection with the common output element via two alternatively shiftable first output transmission ratio steps (B1.1, B1.2), and the second countershaft is in driving connection with the common output element via two alternatively shiftable second output transmission ratio steps (B2.1, B2.2).

With the two embodiments of the double clutch transmission described above, in order to achieve compact dimensions particularly in the axial direction, the gearsets of the first transmission ratio step (A1) and the third transmission ratio step (A3) are expediently arranged in a common gearwheel plane and have a common fixed gearwheel arranged on the first intermediate shaft.

Furthermore, for the same reason it is expediently provided that the gearsets of the second transmission ratio step (A2) and the fourth transmission ratio step (A4) are arranged in a common gearwheel plane and have a common fixed gearwheel arranged on the second intermediate shaft.

Using a structure the same in principle but with double the number of transmission ratio steps (A1 to A8), a twelve-gear version of the double clutch transmission according to the invention is preferably configured in such manner that a shiftable first and a shiftable third transmission ratio step (A1, A3) are in driving connection on the input side with the first intermediate shaft and on the output side with the first countershaft, a shiftable fifth and a shiftable seventh transmission ratio step (A5, A7) are so connected on the input side with the first intermediate shaft and on the output side with the second countershaft, a shiftable second and a shiftable fourth transmission ratio step (A2, A4) are so connected on the input side with the second intermediate shaft and on the output side with the first countershaft, and a shiftable sixth and a shiftable eighth transmission ratio step (A6, A8) are so connected on the input side with the second intermediate shaft and on the output side with the second countershaft, and the first countershaft is in driving connection with the common output element via two alternatively shiftable output transmission ratio steps (B1.1, B1.2), and the second countershaft is in driving connection with the common output element via an output constant (C).

In a similar way a sixteen-gear version of the double clutch transmission according to the invention is preferably configured in such manner that a shiftable first and a shiftable third transmission ratio step (A1, A3) are in driving connection on the input side with the first intermediate shaft and on the output side with the first countershaft, a shiftable fifth and a shiftable seventh transmission ratio step (A5, A7) are so connected on the input side with the first intermediate shaft and on the output side with the second countershaft, a shiftable second and a shiftable fourth transmission ratio step (A4, A4) are so connected on the input side with the second intermediate shaft and on the output side with the first countershaft, and a shiftable sixth and a shiftable eighth transmission ratio step (A6, A8) are so connected on the input side with the second intermediate shaft and on the output side with the second countershaft, and the first countershaft is in driving connection with the common output element via two alternatively shiftable output transmission ratio steps (B1.1, B1.2), and the second countershaft is in driving connection with the common output element via two alternatively shiftable output transmission ratio steps (B2.1, B2.2).

With the two embodiments of the double clutch transmission described above, in order to achieve compact dimensions particularly in the axial direction, it is expediently provided that the gearsets of the first transmission ratio step (A1) and of the fifth transmission ratio step (A5) and/or the gearsets of the third transmission ratio step (A3) and the seventh transmission ratio step (A7) are respectively arranged in a common wheel plane and in each case comprise a common fixed gearwheel arranged on the first intermediate shaft (13), and/or the shift clutches of the first transmission ratio step (A1) and of the third transmission ratio step (A3) and/or the shift clutches of the fifth transmission ratio step (A5) and the seventh transmission ratio step (A7) are respectively combined in a common shifting packet (SA1.1, SA1.2).

Likewise, to achieve compact dimensions of the double clutch transmission described above, particularly in the axial direction, it is advantageous for the gearsets of the second transmission ratio step (A2) and of the sixth transmission ratio step (A6) and/or the gearsets of the fourth transmission ratio step (A4) and of the eighth transmission ratio step (A8) to be respectively arranged in a common wheel plane and in each case to comprise a common fixed gearwheel arranged on the second intermediate shaft, and/or for the shift clutches of the second transmission ratio step (A2) and of the fourth transmission ratio step (A4) and/or the shift clutches of the sixth transmission ratio step (A6) and of the eighth transmission ratio step (A8) respectively to be combined in a common shifting packet (SA2.1; SA2.2).

In the embodiment variants of the double clutch transmission according to the invention in which the two countershafts can be connected to the common output element respectively by means of two alternatively shiftable output transmission ratio steps (B1.1, B1.2; B2.1, B2.2), still more structural space can be saved if the gearsets of the first output transmission ratio steps (B1.1, B1.2) and the second output transmission ratio steps (B2.1, B2.2) are respectively arranged in pairs in a common wheel plane and comprise in the common wheel planes, in each case, a common fixed gearwheel arranged on the common output element.

BRIEF DESCRIPTION OF THE DRAWINGS

To clarify the invention the description of a drawing with example embodiments is attached. The drawings show.

DETAILED DESCRIPTION OF THE PREFERRED EMBODIMENTS

Figure 1:
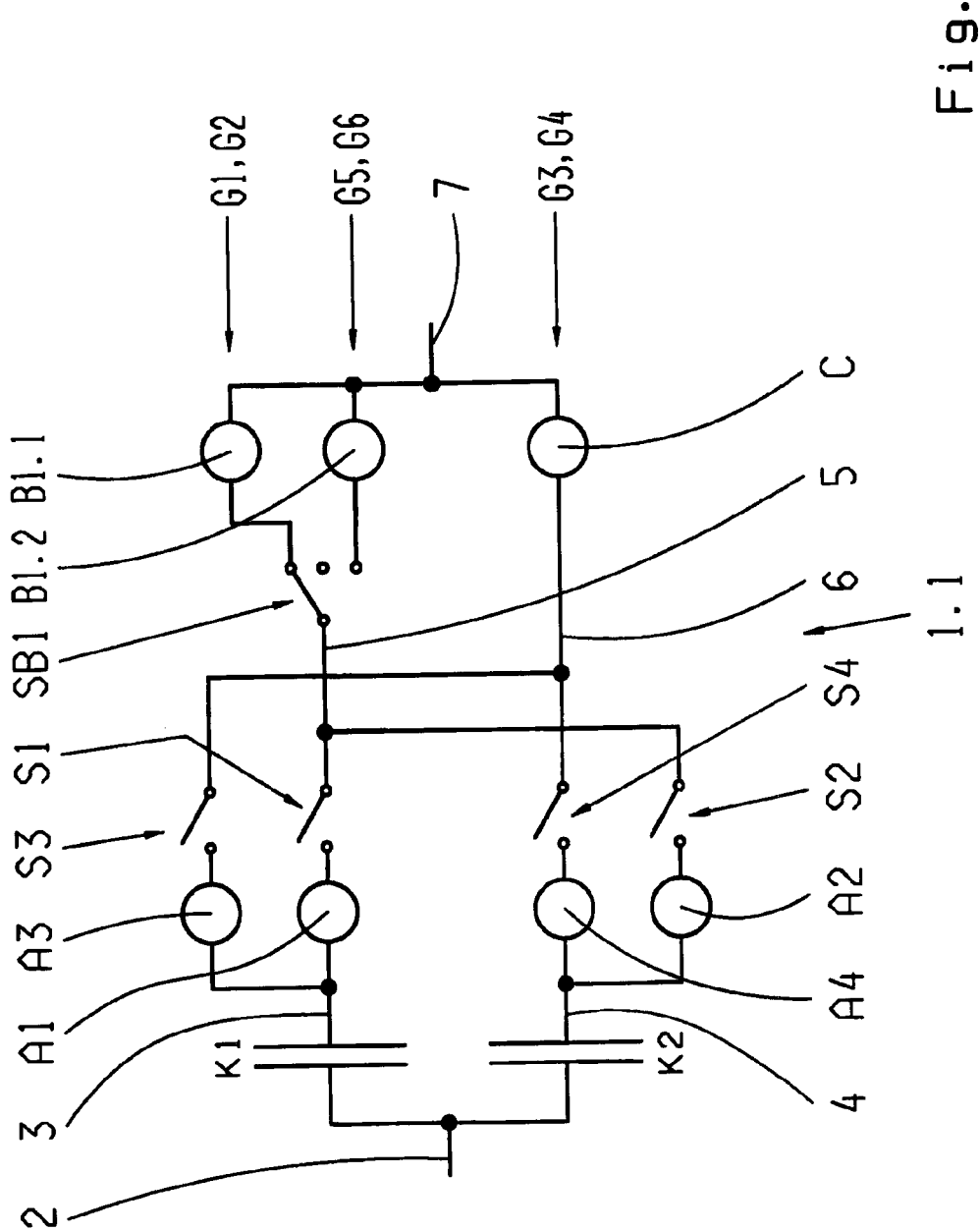
FIG. 1: A six-gear version of the parallel shift transmission according to the invention, shown in the form of a torque transmission scheme.

A parallel shift transmission 1.1 shown in FIG. 1 in the form of a torque transmission scheme with a total of six gear steps G1 to G6, comprises two parallel torque-transmission branches, each of which comprises a respective intermediate element 3, 4 which can be connected on the input side, via an associated power shift element K1, K2, to a common input element 2. A first transmission ratio step A1 that can be engaged by means of an associated clutch S1 is in driving connection on its input side with the first intermediate element 3 and on its output side with a first drive output element 5. A third transmission ratio step A3 that can be engaged by means of an associated clutch S3 is in driving connection on its input side with the first intermediate element 3 and on its output side with a second drive output element 6. A second transmission ratio step A2 that can be engaged by means of a clutch S2 is in driving connection on its input side with the second intermediate element 4 and on its output side with the first drive output element 5. A fourth transmission ratio step A4 that can be engaged by means of an associated clutch S4 is in driving connection on its input side with the second intermediate element 4 and on its output side with the second drive output element 6. The first drive output element 5 is in driving connection with a common output element 7 via two output transmission ratio steps B1.1, B1.2, which can be engaged alternatively by clutches combined in a common shifting packet SB1. The second drive output element 6 is in driving connection with the common output element 7 via an output constant C.

In this way a total of six gear steps G1, G2, G3, G4, G5 and G6 that act between the input element 2 and the output element 7 are obtained. The transmission ratios $i_{A1}$-$i_{A4}$, $i_{B1.1}$, $i_{B1.2}$, $i_C$ of the four transmission ratio steps A1 to A4, the two output transmission ratio steps B1.1, B1.2 and the output constant C are matched to one another in such manner that the first gear step G1 is obtained by the simultaneous engagement of the first transmission ratio step A1 and the first output transmission ratio step B1.1 ($i_{G1}$=$i_{A1}$*$i_{B1.1}$), the second gear step G2 is obtained by the simultaneous engagement of the second transmission ratio step A2 and the first output transmission ratio step B1.1 ($i_{G2}$=$i_{A2}$*$i_{B1.1}$), the third gear step G3 is obtained by the engagement of the third transmission ratio step A3 ($i_{G3}$=$i_{A3}$*$i_C$), the fourth gear step G4 by the engagement of the fourth transmission ratio step A4 ($i_{G4}$=$i_{A4}$*$i_C$), the fifth gear step G5 by the simultaneous engagement of the first transmission ratio step A1 and the second output transmission ratio step B1.2 ($i_{G5}$=$i_{A1}$*$i_{B1.2}$) and the sixth gear step G6 by the simultaneous engagement of the second transmission ratio step A2 and the second output transmission ratio step B1.2 ($i_{G6}$=$i_{A2}$*$i_{B1.2}$). Since the force flow for torque transmission takes place in the ascending sequence of gear steps G1-G6 in each case alternately via the first power shift element K1 and the second power shift element K2, all sequential gearshifts, i.e. gearshifts between adjacent gear steps, can be carried out as load shifts and therefore without interruption of the traction force.

Figure 2:
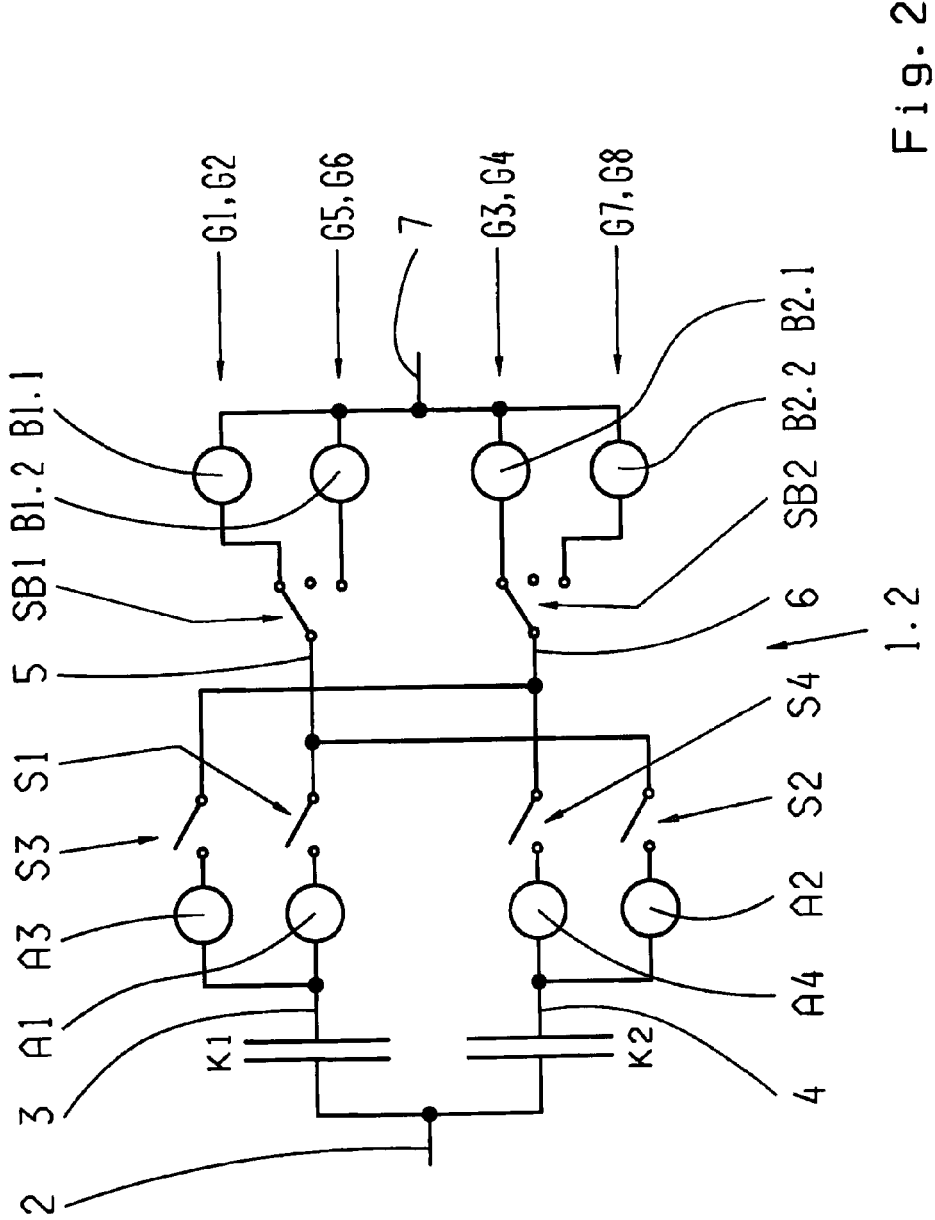
FIG. 2: An eight-gear version of the parallel shift transmission according to the invention, shown in the form of a torque transmission scheme.

A parallel shift transmission 1.2 shown in FIG. 2 in the form of a torque transmission scheme with a total of eight gear steps G1 to G8 is configured largely identically to the parallel shift transmission 1.1 according to FIG. 1, but differs therefrom in that the second drive output element 6, (instead of via the output constant C), can this time be brought alternatively into driving connection with the common output element 7 by means of two second output transmission ratio steps B2.1 and B2.2 which can be engaged alternatively by associated clutches combined in a common shifting packet SB2. The transmission ratios $i_{A1}$-$i_{A4}$, $i_{B1.1}$-$i_{B2.2}$ of the four transmission ratio steps A1, A2, A3, A4 and the four output transmission ratio steps B1.1, B1.2 and B2.1, B2.2 are matched to one another in such manner that in this case the third gear step G3 is obtained by the simultaneous engagement of the third transmission ratio step A3 and the third output transmission ratio step B2.1 ($i_{G3}=i_{A3}*i_{B2.1}$) and the fourth gear step G4 is obtained by the simultaneous engagement of the third transmission ratio step A4 and the third output transmission ratio step B2.1 ($i_{G4}=i_{A4}*i_{B2.1}$). In addition, the additional seventh gear step G7 is obtained by the simultaneous engagement of the third transmission ratio step A3 and the fourth output transmission ratio step B2.2 ($i_{G7}=i_{A3}*i_{B2.2}$), while the additional eighth gear step G8 is obtained by the simultaneous engagement of the fourth transmission ratio step A4 together with the fourth output transmission ratio step B2.2 ($i_{G8}=i_{A4}*i_{B2.2}$). In this embodiment of the parallel shift transmission 1.2 according to the invention as well, all sequential shift operations can be carried out as load shifts.

Figure 3:
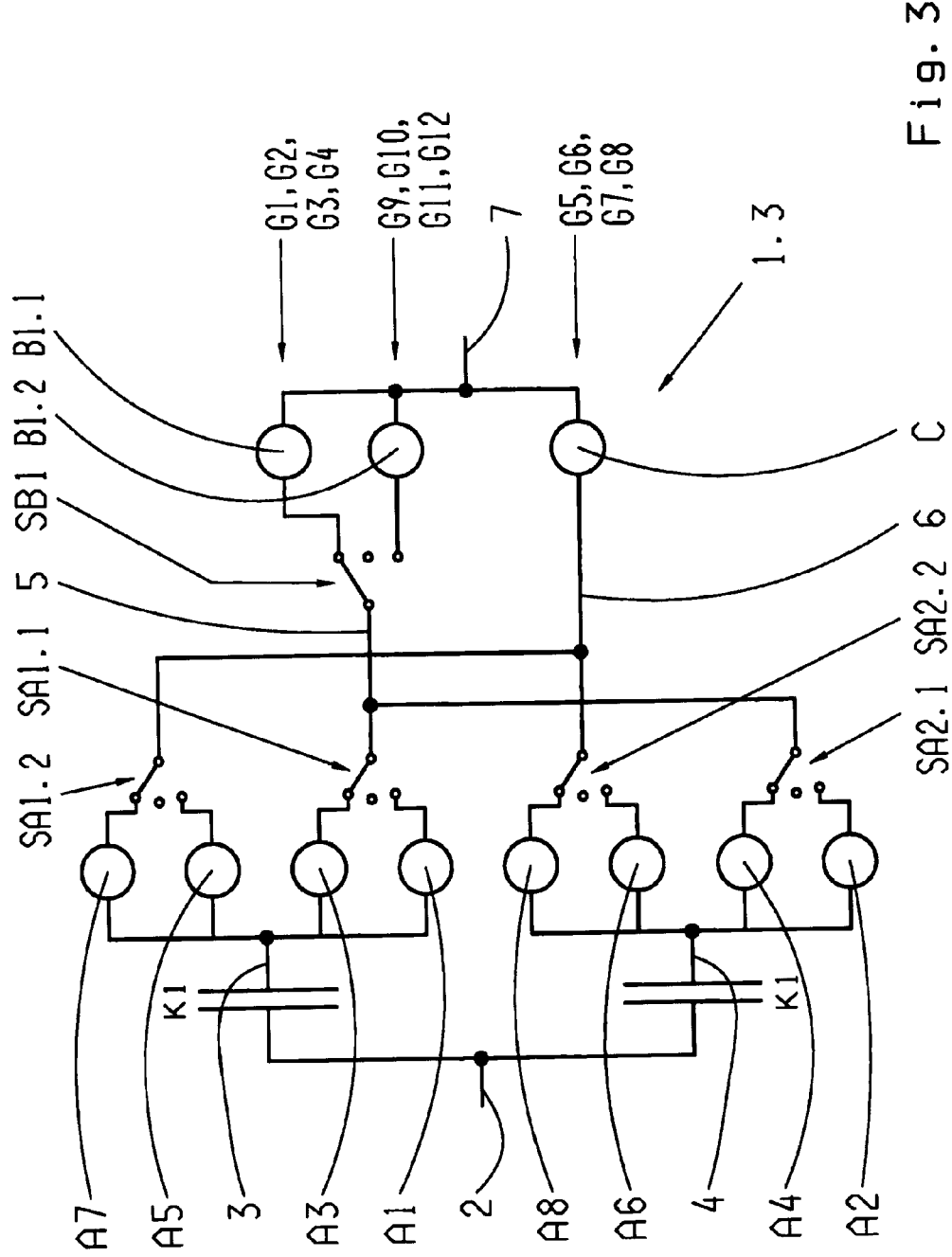
FIG. 3: A twelve-gear version of the parallel shift transmission according to the invention, shown in the form of a torque transmission scheme.

A parallel shift transmission 1.3 shown in FIG. 3 in the form of a torque transmission scheme with a total of twelve gear steps G1 to G12 is in its basic layout identical to the parallel shift transmission 1.1 shown in FIG. 1, but differs therefrom in that the two intermediate elements 3, 4, (instead of via a shiftable transmission ratio step A1, A3; A2, A4), can now be brought into driving connection with the first drive output element 5 and the second drive output element 6 by means of two transmission ratio steps A1/A3, A5/A7; A2/A4, A6/A8, which can be engaged alternatively by associated clutches respectively combined in a common shifting packet SA1.1, SA1.2, SA2.1, SA2.2.

Specifically, according to FIG. 3 the transmission ratio steps A1 and A3, that can be engaged alternatively by means of the clutches of the first shifting packet SA1.1, are in driving connection on the input side with the first intermediate element 3 and on the output side with the first drive output element 5, the transmission ratio steps A5 and A7 that can be engaged alternatively by means of the clutches of the second shifting packet SA1.2 are in driving connection on the input side with the first intermediate element 3 and on the output side with the second drive output element 6, the transmission ratio steps A2 and A4 that can be engaged alternatively by means of the clutches of the third shifting packet SA2.1 are in driving connection on the input side with the second intermediate element 4 and on the output side with the first drive output element 5, and the transmission ratio steps A6 and A8 that can be engaged alternatively by means of the clutches of the fourth shifting packet SA2.2 are in driving connection on the input side with the second intermediate element 4 and on the output side with the second drive output element 6. As in the embodiment variant 1.1 shown in FIG. 1, the first drive output element 5 is in driving connection with a common output element 7 via two output transmission ratio steps B1.1 and B1.2, which can be engaged alternatively by means of associated clutches combined in a common shifting packet SB1, and the second drive output element 6 is in driving connection with the common output element 7 via an output constant C.

The transmission ratios $i_{A1}$-$i_{AB}$, $i_{B1.1}$, $i_{B1.2}$, $i_C$ of the eight transmission ratio steps A1 to A8, those of the two output transmission ratio steps B1.1, B1.2 and that of the output constant C are matched to one another in such manner that the first gear step G1 is obtained by the simultaneous engagement of the first transmission ratio step A1 and the first output transmission ratio step B1.1 ($i_{G1}=i_{A1}*i_{B1.1}$), the second gear step G2 is obtained by the simultaneous engagement of the second transmission ratio step A2 and the first output transmission ratio step B1.1 ($i_{G2}=i_{A2}*i_{1.1}$), the third gear step G3 is obtained by the simultaneous engagement of the third transmission ratio step A3 and the first output transmission ratio step B1.1 ($i_{G3}=i_{A3}*i_{B1.1}$), the fourth gear step G4 is obtained by the simultaneous engagement of the fourth transmission ratio step A4 and the first output transmission ratio step B1.1 ($i_{G4}=i_{A4}*i_{B1.1}$), the fifth gear step G5 is obtained by the engagement of the fifth transmission ratio step A5 ($i_{G5}=i_{A5}*i_C$), the sixth gear step G6 is obtained by the engagement of the sixth transmission ratio step A6 ($i_{G6}=i_{A6}*i_C$), the seventh gear step G7 is obtained by the engagement of the seventh transmission ratio step A7 ($i_{G7}=i_{A7}*i_C$), the eighth gear step G8 is obtained by the engagement of the eighth transmission ratio step A8 ($i_{G8}=i_{A8}*i_C$), the ninth gear step G9 is obtained by the simultaneous engagement of the first transmission ratio step A1 and the second output transmission ratio step B1.2 ($i_{G9}=i_{A1}*i_{B1.2}$), the tenth gear step G10 is obtained by the simultaneous engagement of the second transmission ratio step A2 and the second output transmission ratio step B1.2 ($i_{G10}=i_{A2}*i_{B1.2}$), the eleventh gear step G11 is obtained by the simultaneous engagement of the third transmission ratio step A3 and the second output transmission ratio step B1.2 ($i_{G11}=i_{A3}*i_{B1.2}$), and the twelfth gear step G12 is obtained by the simultaneous engagement of the fourth transmission ratio step A4 and the second output transmission ratio step B1.2 ($i_{G12}=i_{A4}*i_{B1.2}$). Since in this embodiment the force flow for torque transmission again takes place in ascending sequence of the gear steps G1 to G12 respectively in alternation via the first load-shift element K1 and the second load-shift element K2, in this parallel shift transmission 1.3 as well all sequential shifts can be carried out as power shifts.

Figure 4:
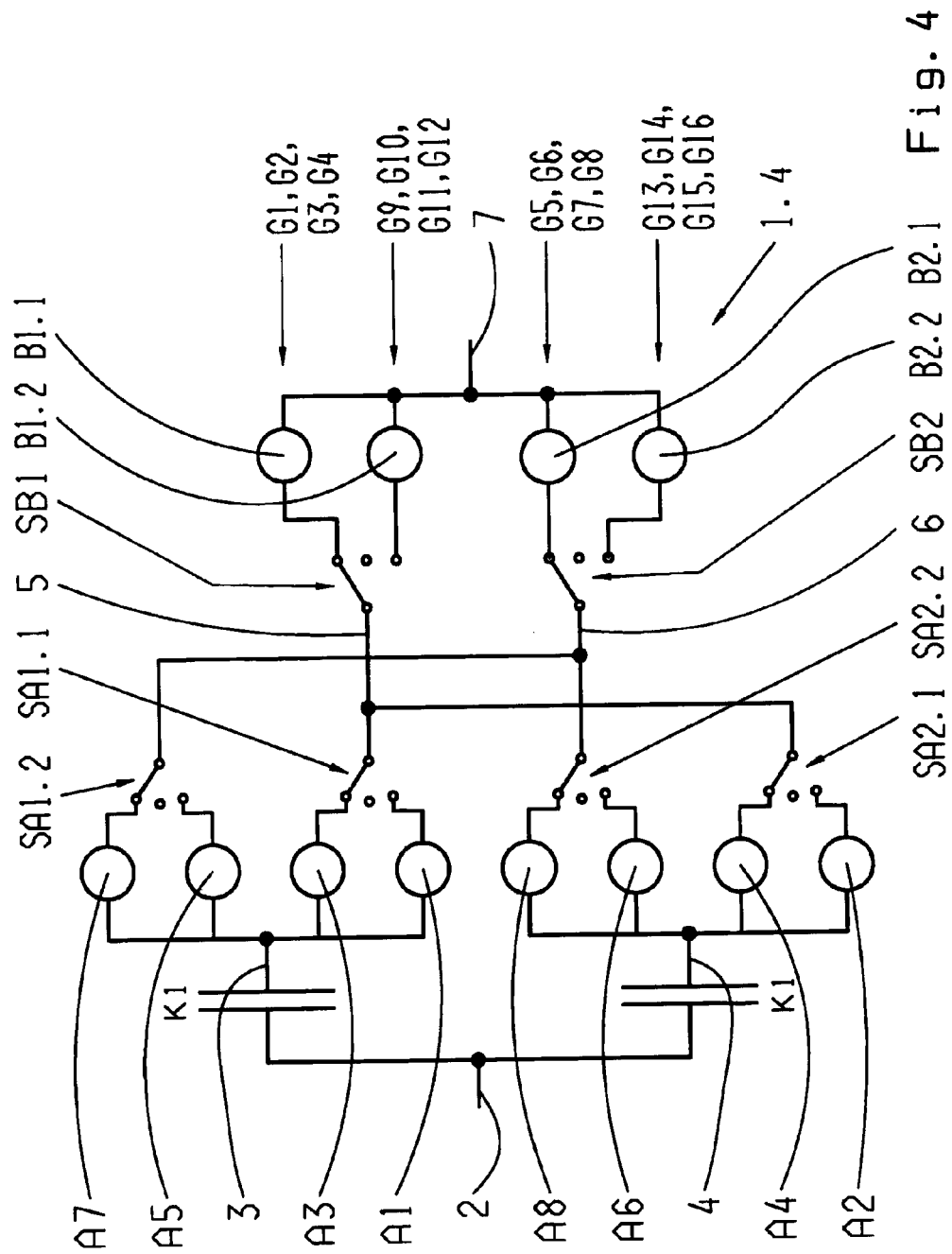
FIG. 4: A sixteen-gear version of the parallel shift transmission according to the invention, shown in the form of a torque transmission scheme.

A parallel shift transmission 1.4 shown in FIG. 4 in the form of a torque transmission scheme with a total of sixteen gear steps G1 to G16 is in its basic configuration identical to the parallel shift transmission 1.3 shown in FIG. 3, but differs therefrom in that the second drive output element 6, (instead of via the output constant C), can in this case, as in the embodiment of FIG. 2, be brought into driving connection with the common output element 7 via two output transmission ratio steps B2.1 and B2.2, which can be engaged alternatively by means of associated clutches combined in a common shifting packet SB2.

The transmission ratios $i_{A1}$-$i_{A8}$, $i_{B1.1}$-$i_{B2.2}$ of the eight transmission ratio steps A1 to A8 and those of the four output transmission ratio steps B1.1, B1.2, B2.1, B2.2 are matched to one another in such manner that in this case the fifth gear step G5 is obtained by the simultaneous engagement of the fifth transmission ratio step A5 and the third output transmission ratio step B2.1 ($i_{G5}=i_{A5}*i_{B2.1}$) the sixth gear step G6 is obtained by the simultaneous engagement of the sixth transmission ratio step A6 and the third output transmission ratio step B2.1 ($i_{G6}=i_{A6}*i_{B2.1}$), the seventh gear step G7 is obtained by the simultaneous engagement of the seventh transmission ratio step A7 and the third output transmission ratio step B2.1 ($i_{G7}=i_{A7}*i_{B2.1}$), and the eighth gear step G8 is obtained by the simultaneous engagement of the eighth transmission ratio step A8 and the third output transmission ratio step B2.1 ($i_{G8}=i_{A8}*i_{B2.1}$).

Furthermore, it is provided that the additional, thirteenth gear step G13 is obtained by the simultaneous engagement of the fifth transmission ratio step A5 and the fourth output transmission ratio step B2.2 ($i_{G13}=i_{A5}*i_{B2.2}$), the additional fourteenth gear step G14 is obtained by the simultaneous engagement of the sixth transmission ratio step A6 and the fourth output transmission ratio step B2.2 ($i_{G14}=i_{A6}*i_{B2.2}$), the additional fifteenth gear step G15 is obtained by the simultaneous engagement of the seventh transmission ratio step A7 and the fourth output transmission ratio step B2.2 ($i_{G15}=i_{A7}*i_{B2.2}$) and the additional sixteenth gear step G16 is obtained by the simultaneous engagement of the eighth transmission ratio step A8 and the fourth output transmission ratio step B2.2 ($i_{G16}=i_{A8}*i_{B2.2}$). In this embodiment of the parallel shift transmission 1.4 too, all sequential shift operations can be carried out as power shifts.

Figure 5:
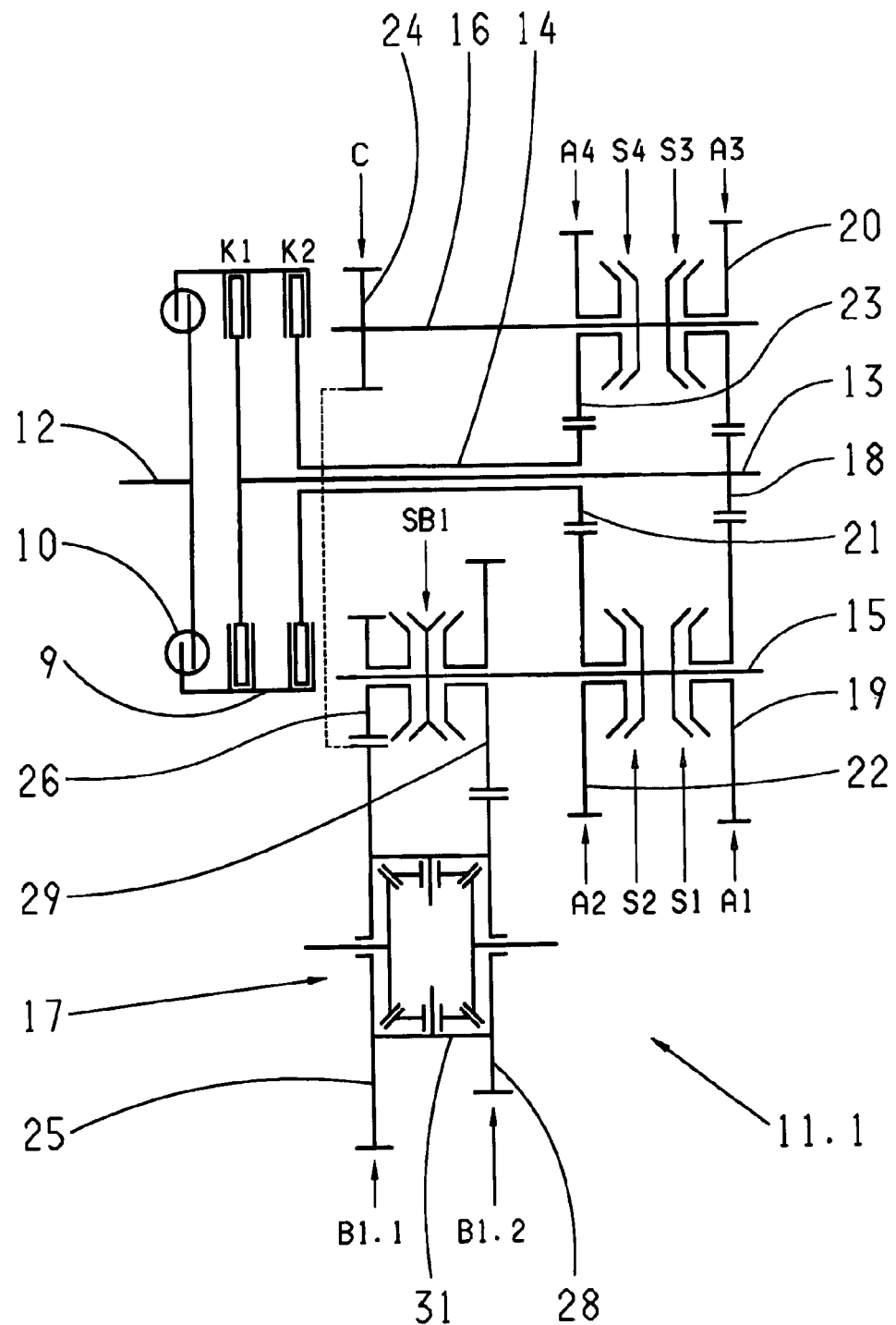
FIG. 5: A six-gear version of the double clutch transmission according to the invention, shown in the form of a transmission layout.

A geared double clutch transmission 11.1 shown in FIG. 5 in the form of a transmission layout with a total of six gear steps G1 to G6, has two parallel torque-transmission branches, each of which comprises a respective intermediate shaft 13, 14 which can be connected to a common input shaft 12 on its input side via an associated friction clutch K1, K2 with a common clutch cage 9 and a rotational vibration damper 10. The two intermediate shafts 13, 14 are arranged coaxially with one another, the second intermediate shaft 14 being made as a hollow shaft which is arranged coaxially around the central, first intermediate shaft 13.

A first transmission ratio step A1 that can be engaged by means of an associated clutch S1 is in driving connection on its input side with the first intermediate shaft 13 and on its output side with a first countershaft 15 arranged axis-parallel to the two intermediate shafts 13, 14. A third transmission ratio step A3 that can be engaged by means of an associated clutch S3 is in driving connection on its input side with the first intermediate shaft 13 and on its output side with a second countershaft 16 arranged axis-parallel to the two intermediate shafts 13, 14 and the first countershaft 15.

A second transmission ratio step A2 that can be engaged by means of an associated clutch S2 is in driving connection on its input side with the second intermediate shaft 14 and on its output side with the first countershaft 15. A fourth transmission ratio step A4 that can be engaged by means of an associated clutch S4 is in driving connection on its input side with the second intermediate shaft 14 and on its output side with the second countershaft 16. The first countershaft 15 can be coupled to an axle differential 17 of a driven axle close to the transmission by means of two output transmission ratio steps B1.1, B1.2 which can be engaged alternatively by associated clutches combined in a common shifting packet SB1. The second countershaft is in driving connection with the axle differential 17 via an output constant C.

The transmission ratio steps A1 to A4 are formed, respectively, by a gearwheel pair consisting of a fixed gearwheel 18; 21 and an idler gearwheel 19, 20; 22, 23. The gearwheels 18, 19, 20 of the first and third transmission ratio steps A1, A3 are arranged in a common gearwheel plane and have a common fixed gearwheel 18, which is arranged on the first intermediate shaft 13. The gearwheels 21, 22, 23 of the second and fourth transmission ratio steps A2, A4 are also arranged in a common gearwheel plane and also have a common fixed gearwheel, namely 21, which is arranged on the second intermediate shaft 14.

The output transmission ratio steps B1.1, B1.2 are also in each case formed by a gearwheel pair consisting of a fixed gearwheel 25; 28 and an idler gearwheel 26; 29, such that the fixed gearwheels 25, 28 are connected fixed to the differential cage 31 of the axle differential 17, and the idler gearwheels 26, 29 are mounted and able to rotate on the first countershaft 15 and can be connected thereto by the clutches of the shifting packet SB1. The output constant C is formed by a fixed gearwheel 24 arranged in the gearwheel plane of the gearwheels 25, 26 of the first output transmission ratio step B1.1 rotationally fixed on the second countershaft 16 and the fixed gearwheel 25 of the first transmission ratio step B1.1 that meshes with it. Thus, the structure of the double clutch transmission 11.1 is geometrically relatively simple and particularly space-saving, both axially and radially.

By virtue of appropriate design of the transmission ratios $i_{A1}$-$i_{A4}$, $i_{B1.1}$, $i_{B1.2}$, $i_C$ of the four transmission ratio steps A1 to A4, the two output transmission ratio steps B1.1 and B1.2 and the output constant C, the six gear steps G1 to G6 are obtained as follows:

The first gear step G1 is obtained by the simultaneous engagement of the first transmission ratio step A1 and the first output transmission ratio step B1.1 ($i_{G1}=i_{A1}*i_{B1.1}$), the second gear step G2 by the simultaneous engagement of the second transmission ratio step A2 and the first output transmission ratio step B1.1 ($i_{G2}=i_{A2}*i_{B1.1}$), the third gear step G3 by the engagement of the third transmission ratio step A3 ($i_{G3}=i_{A3}*i_C$), the fourth gear step G4 by the engagement of the fourth transmission ratio step A4 ($i_{G4}=i_{A4}*i_C$), the fifth gear step G5 by the simultaneous engagement of the first transmission ratio step A1 and the second output transmission ratio step B1.2 ($i_{G5}=i_{A1}*i_{B1.2}$) and the sixth gear step G6 by the simultaneous engagement of the second transmission ratio step A2 and the second output transmission ratio step B1.2 ($i_{G6}=i_{A2}*i_{B1.2}$). Since the force flow for torque transmission takes place in ascending sequence of the gear steps G1 to G6 respectively in alternation via the first friction clutch K1 and the second friction clutch K2, all sequential shift operations, i.e. shifts between adjacent gear steps, can be carried out as power shift operations and therefore without traction force interruption.

Figure 6:
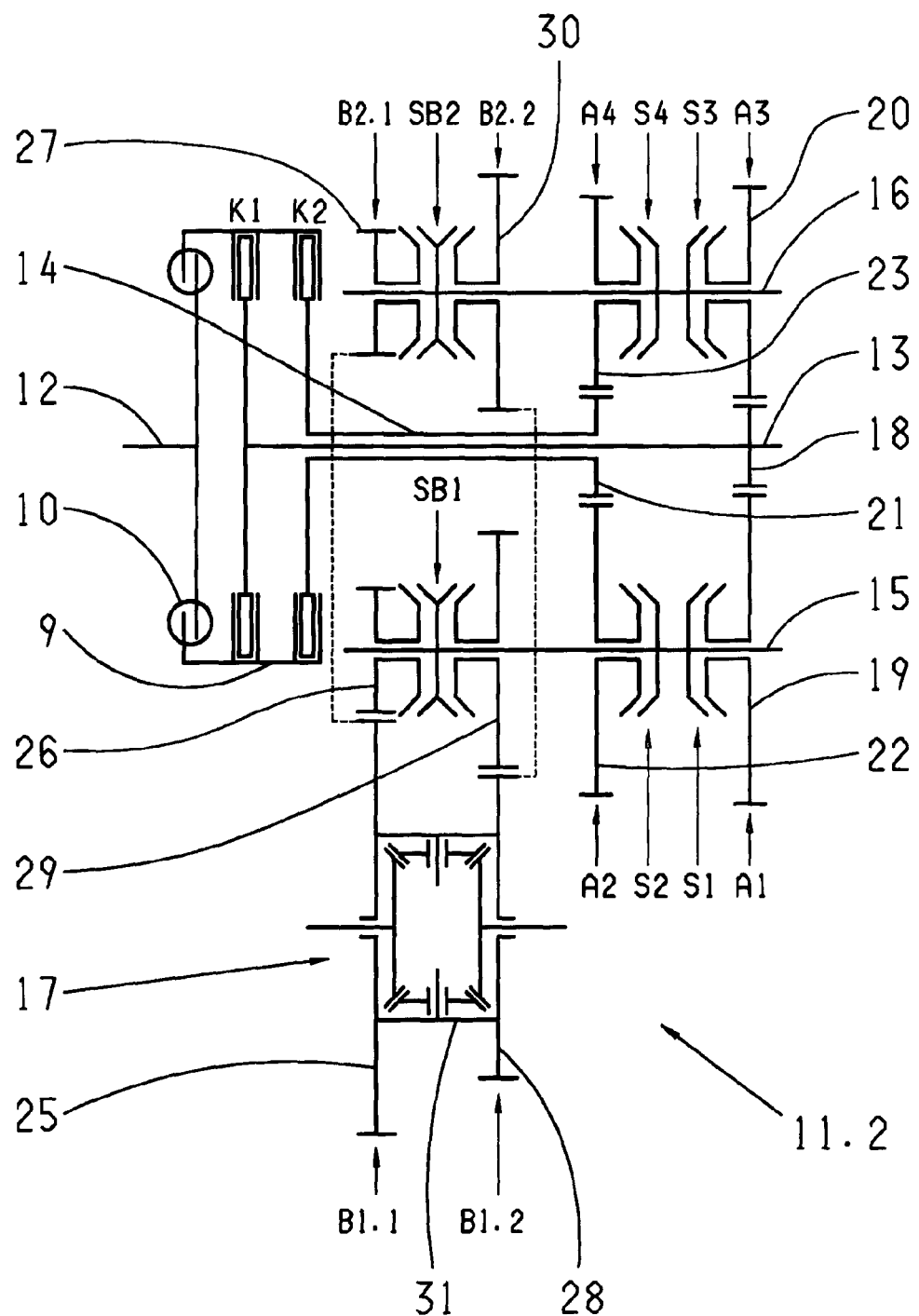
FIG. 6: An eight-gear version of the double clutch transmission according to the invention, shown in the form of a transmission layout.

A double clutch transmission 11.2 represented in FIG. 6 in the form of a transmission layout with a total of eight gear steps G1 to G8 is configured largely identically to the double clutch transmission 11.1 of FIG. 5, but differs therefrom in that the second countershaft 16, (instead of via the output constant C), can in this case be brought into driving connection with the axle differential 17 by means of two second output transmission ratio steps B2.1, B2.2 which can be engaged alternatively by associated clutches combined in a common shifting packet SB2. The output transmission ratio steps B2.1, B2.2 are in each case formed by a gearwheel pair consisting of a fixed gearwheel 25; 28 and an idler gearwheel 27; 30, such that the idler gearwheels 27, 30 are arranged on the second countershaft 16 in the gearwheel planes of the gearwheels 25, 26; 28, 29 of the first output transmission ratio steps B1.1 and B1.2, and use the same fixed gearwheels 25, 28 on the differential cage 31 by virtue of a corresponding tooth engagement.

By virtue of appropriate design of the transmission ratios $i_{A1}$-$i_{A4}$, $i_{B1.1}$-$i_{B2.2}$ of the four transmission ratio steps A1 to A4 and the four output transmission ratio steps B1.1, B1.2, B2.1, B2.2, the gear steps G3 and G4 and the additional gear steps G7 and G8 can now be obtained as follows:

The third gear step G3 is obtained by the simultaneous engagement of the third transmission ratio step A3 and the third output transmission ratio step B2.1 ($i_{G3}=i_{A3}*i_{B2.1}$), the fourth gear step G4 is obtained by the simultaneous engagement of the fourth transmission ratio step A4 and the third output transmission ratio step B2.1 ($i_{G4}=i_{A4}*i_{B2.1}$), the seventh gear step G7 is obtained by the simultaneous engagement of the third transmission ratio step A3 and the fourth output transmission ratio step B2.2 ($i_{G7}=i_{A3}*i_{B2.2}$) and the additional eighth gear step G8 by the simultaneous engagement of the fourth transmission ratio step A4 and the fourth output transmission ratio step B2.2 ($i_{G8}=i_{A4}*i_{B2.2}$).

In this embodiment variant of the parallel shift transmission 11.2 according to the invention as well, all sequential shifts can in each case be carried out as load shifts. The structural space taken up by the present double clutch transmission 11.2 corresponds largely to that of the double clutch transmission 11.1 according to FIG. 5. Thanks to a modular structure both double clutch transmissions can be produced inexpensively as different versions of a common basic transmission.

Figure 7:
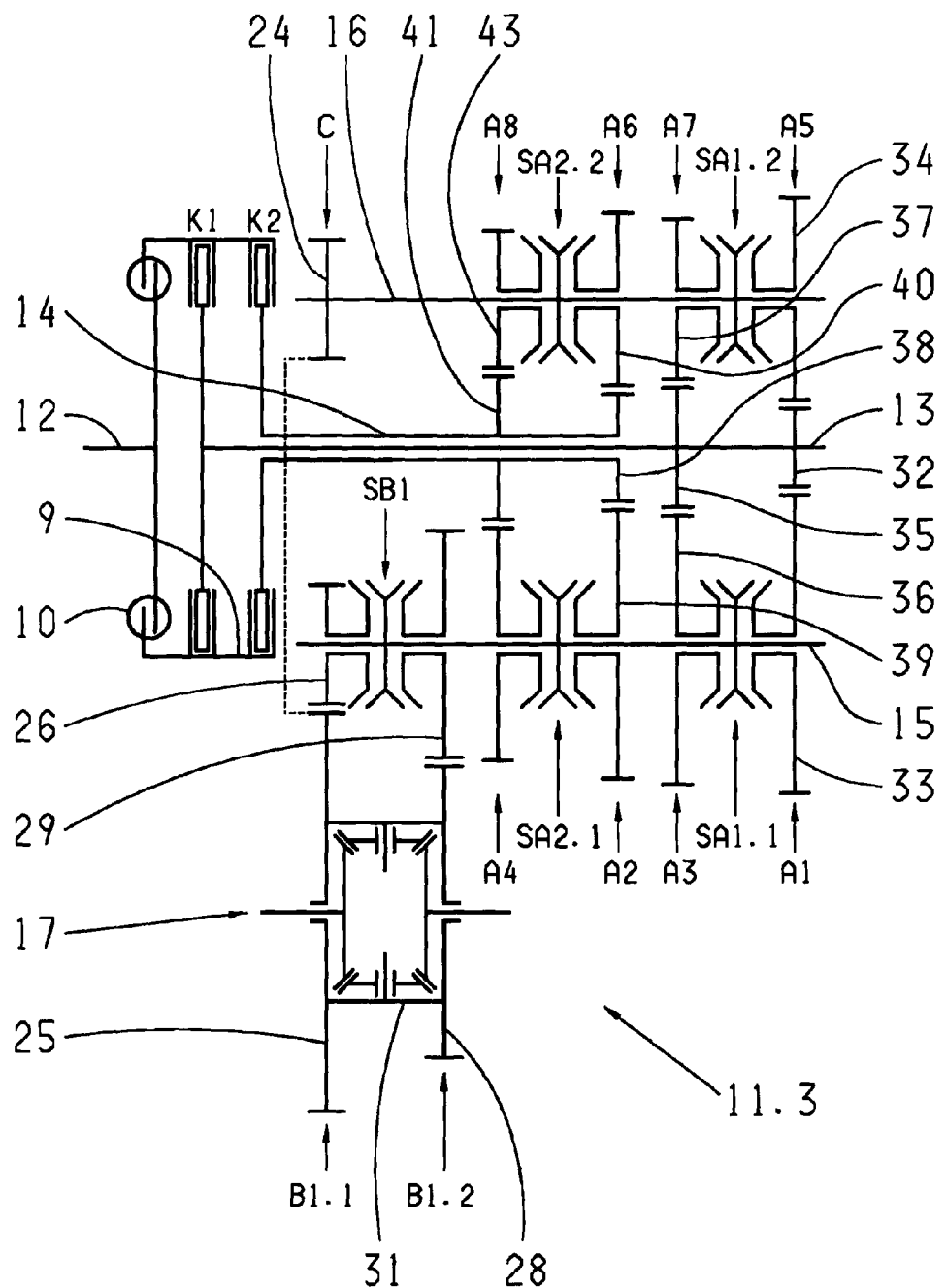
FIG. 7: A twelve-gear version of the double clutch transmission according to the invention, shown in the form of a transmission layout.

A geared double clutch transmission 11.3 represented in FIG. 7 in the form of a transmission layout with a total of twelve gear steps G1 to G12 is identical in its basic layout to the double clutch transmission 11.1 of FIG. 5, but differs therefrom in that the two intermediate shafts 13 and 14, (instead of a respective shiftable transmission ratio step A1, A3; A2, A4), can in this case be brought into driving connection with the first counter shaft 15 and the second countershaft 16 by means of two respective transmission ratio steps A1/A3, A5/A7; A2/A4, A6/A8, which can be engaged alternatively by means of associated clutches respectively combined in a common shifting packet SA1.1, SA 1.2, SA2.1, SA2.2.

To be specific, the transmission ratio steps A1, A3 that can be engaged alternatively by the clutches of the first shifting packet SA1.1 are in driving connection on their input side with the first intermediate shaft 13 and on their output side with the first countershaft 15, the transmission ratio steps A5, A7 that can be engaged alternatively by the clutches of the second shifting packet SA1.2 are in driving connection on their input side with the first intermediate shaft 13 and on their output side with the second countershaft 16, the transmission ratio steps A2, A4 that can be engaged alternatively by the clutches of the third shifting packet SA2.1 are in driving connection on their input side with the second intermediate shaft 14 and on their output side with the first countershaft 15, and the transmission ratio steps A6, A8 that can be engaged alternatively by the clutches of the fourth shifting packet SA2.2 are in driving connection on their input side with the second intermediate shaft 14 and on their output side with the second countershaft 16.

As in the embodiment variant 11.1 according to FIG. 5, the first countershaft 15 is in driving connection with an axle differential 17 via two output transmission ratio steps B1.1 and B1.2 which can be engaged alternatively by means of associated clutches combined in a common shifting packet, and the second countershaft 16 is so connected to the axle differential 17 via an output constant C.

The transmission ratio steps A1 to A8 are in each case formed by a gearwheel pair consisting of a fixed gearwheel 32; 35; 38; 41 and an idler gearwheel 33, 34; 36, 37; 39, 40; 42, 43. The gearwheels 32, 33, 34 of the first and fifth transmission ratio steps A1 and A5 are arranged in a common gearwheel plane and have a common fixed gearwheel 32 which is arranged on the first intermediate shaft 13. Likewise, the gearwheels 35, 36, 37 of the third and seventh transmission ratio steps A3 and A7 are arranged in a common gearwheel plane and have a common fixed gearwheel 35 which is arranged on the first intermediate shaft 13.

The gearwheels 38, 39, 40 of the second and sixth transmission ratio steps A2, A6 are also arranged in a common gearwheel plane and also have a common fixed gearwheel 38, which is arranged on the second intermediate shaft 14. Likewise, the gearwheels 41, 42, 43 of the fourth and eighth transmission ratio steps A4, A8 are arranged in a common gearwheel plane and have a common fixed gearwheel 41, which is arranged on the second intermediate shaft 14. Having regard to the large number of gear steps G1 to G12, the structure of the double clutch transmission 11.3 is geometrically relatively simple and particularly space-saving, both radially and axially.

By virtue of appropriate design of the transmission ratios $i_{A1}$-$i_{A8}$, $i_{B1.1}$, $i_{B1.2}$, $i_C$ of the eight transmission ratio steps A1 to A8, the two output transmission ratio steps B1.1 and B1.2, and the output constant C, the gear steps G1 to G12 can be obtained as follows:

The first gear step G1 is obtained by the simultaneous engagement of the first transmission ratio step A1 and the first output transmission ratio step B1.1 ($i_{G1}=i_{A1}*i_{B1.1}$), the second gear step G2 by the simultaneous engagement of the second transmission ratio step A2 and the first output transmission ratio step B1.1 ($i_{G2}=i_{A2}*i_{B1.1}$), the third gear step G3 by the simultaneous engagement of the third transmission ratio step A3 and the first output transmission ratio step B1.1 ($i_{G3}=i_{A3}*i_{B1.1}$), the fourth gear step G4 by the simultaneous engagement of the fourth transmission ratio step A4 and the first output transmission ratio step B1.1 ($i_{G4}=i_{A4}*i_{B1.1}$), the fifth gear step G5 by the engagement of the fifth transmission ratio step A5 ($i_{G5}=i_{A5}*i_C$), the sixth gear step G6 by the engagement of the sixth transmission ratio step A6 ($i_{G6}=i_{A6}*i_C$), the seventh gear step G7 by the engagement of the seventh transmission ratio step A7 ($i_{G7}=i_{A7}*i_C$), the eighth gear step G8 by the engagement of the eighth transmission ratio step A8 ($i_{G8}=i_{A8}*i_C$), the ninth gear step G9 by the simultaneous engagement of the first transmission ratio step A1 and the second output transmission ratio step B1.2 ($i_{G9}=i_{A1}*i_{B1.2}$), the tenth gear step G10 by the simultaneous engagement of the second transmission ratio step A2 and the second output transmission ratio step B1.2 ($i_{G10}=i_{A2}*i_{B1.2}$), the eleventh gear step G11 by the simultaneous engagement of the third transmission ratio step A3 and the second output transmission ratio step B1.2 ($i_{G11}=i_{A3}*i_{B1.2}$) and the twelfth gear step G12 by the simultaneous engagement of the fourth transmission ratio step A4 and the second output transmission ratio step B1.2 ($i_{G12}=i_{A4}*i_{B1.2}$).

Since in this embodiment variant too the force flow of torque transmission takes place in the ascending sequence of the gear steps G1 to G12 in each case alternately by means of the first friction clutch K1 and the second friction clutch K2, with this double clutch transmission 11.3 as well, all sequential shift operations can respectively be carried out as power shift operations.

Figure 8:
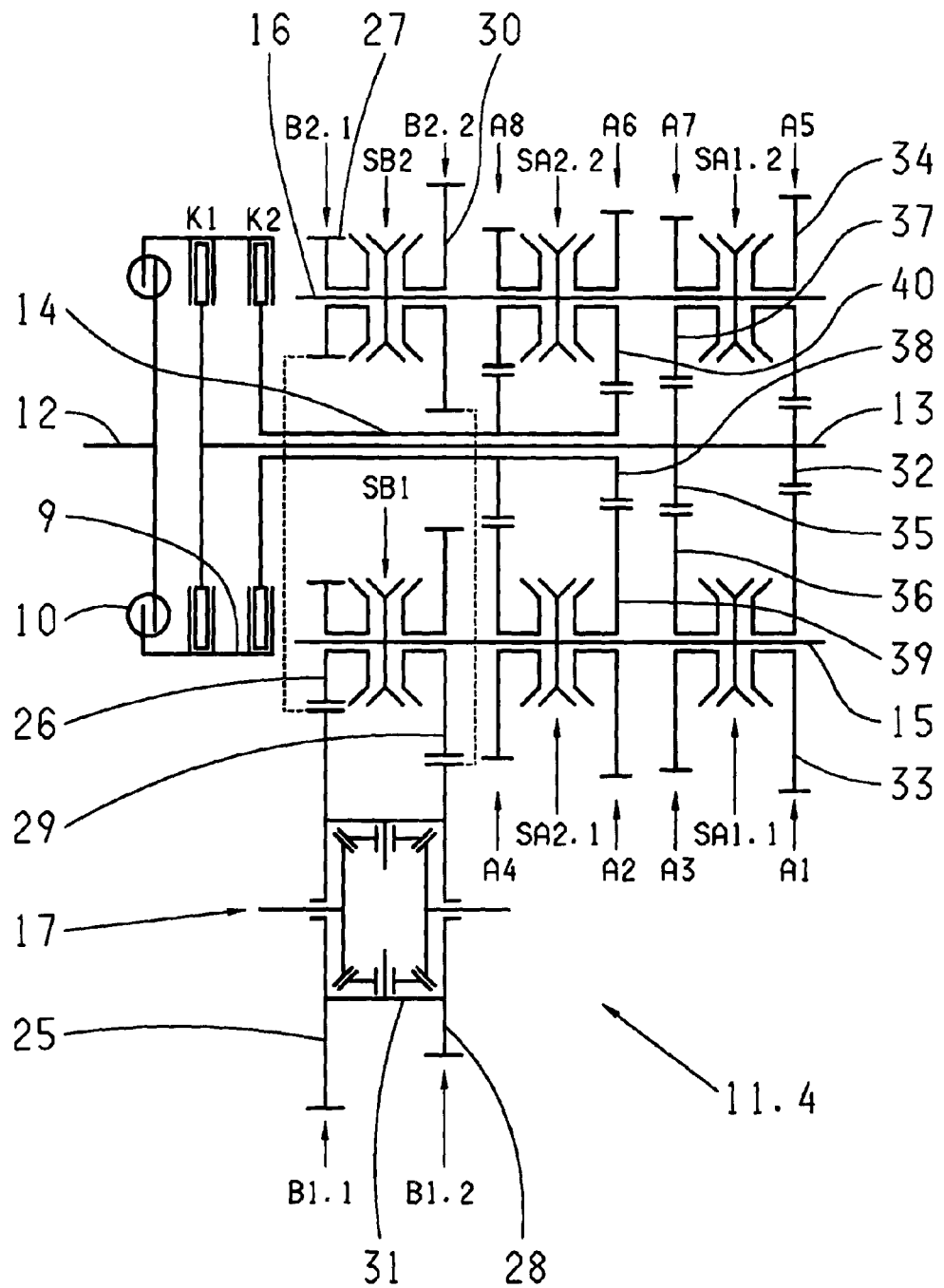
FIG. 8: A sixteen-gear version of a double clutch transmission according to the invention, shown in the form of a transmission layout.

A geared double clutch transmission 11.4 represented in FIG. 8 in the form of a transmission layout with a total of sixteen gear steps G1 to G16 is configured largely identically to the double clutch transmission 11.3 of FIG. 7, but differs therefrom in that the second countershaft 16, (instead of via the output constant C), can now, in the same way as in the embodiment shown in FIG. 6, be brought into driving connection with the axle differential 17 by two second output transmission ratio steps B2.1, B2.2 which can be engaged alternatively by means of associated clutches combined in a common shifting packet SB2.

As in the embodiment variant according to FIG. 6, the output transmission ratio steps B2.1 and B2.2 are in each case formed by a gearwheel pair consisting of a fixed gearwheel 25; 28 and an idler gearwheel 27; 30, these idler gearwheels 27, 30 being arranged in the gearwheel planes of the gearwheels 25, 26; 28, 29 of the first output transmission ratio steps B1.1, B1.2 on the second countershaft 16 and using the fixed gearwheels 25, 28 by a corresponding tooth engagement.

By virtue of appropriate design of the transmission ratios $i_{A1}$-$i_{A8}$, $i_{B1.1}$-$i_{B2.2}$ of the total of eight transmission ratio steps A1 to A4 and the four output transmission ratio steps B1.1 to B2.2, the gear steps G5 to G8 and the additional gear steps G13 to G16 can now be obtained as follows:

The fifth gear step G5 is obtained by the simultaneous engagement of the fifth transmission ratio step A5 and the third output transmission ratio step B2.1 ($i_{G5}=i_{A5}*i_{B2.1}$), the sixth gear step G6 by the simultaneous engagement of the sixth transmission ratio step A6 and the third output transmission ratio step B2.1 ($i_{G6}=i_{A6}*i_{B2.1}$), the seventh gear step G7 by the simultaneous engagement of the seventh transmission ratio step A7 and the third output transmission ratio step B2.1 ($i_{G7}=i_{A7}*i_{B2.1}$), the eighth gear step G8 by the simultaneous engagement of the eighth transmission ratio step A8 and the third output transmission ratio step B2.1 ($i_{G8}=i_{A8}*i_{B2.1}$), the thirteenth gear step G13 by the simultaneous engagement of the fifth transmission ratio step A5 and the fourth output transmission ratio step B2.2 ($i_{G13}=i_{A5}*i_{B2.2}$), the fourteenth gear step G14 by the simultaneous engagement of the sixth transmission ratio step A6 and the fourth output transmission ratio step B2.2 ($i_{G14}=i_{A6}*i_{B2.2}$), the fifteenth gear step G15 by the simultaneous engagement of the seventh transmission ratio step A7 and the fourth output transmission ratio step B2.2 ($i_{G15}=i_{A7}*i_{B2.2}$) and the sixteenth gear step G16 by the simultaneous engagement of the eighth transmission ratio step A8 and the fourth output transmission ratio step B2.2 ($i_{G16}=i_{A8}*i_{B2.2}$).

In this embodiment variant of the parallel shift transmission 11.4 according to the invention as well, all sequential shifts can be carried out as power shift operations in each case. The structural space required by the present double clutch transmission 11.4 is much the same as that occupied by the double clutch transmission 11.3 of FIG. 7.

INDEXES

| | |
|---|---|
| 1.1 | Parallel shift transmission |
| 1.2 | Parallel shift transmission |
| 1.3 | Parallel shift transmission |
| 1.4 | Parallel shift transmission |
| 2 | Input element |
| 3 | First intermediate element |
| 4 | Second intermediate element |
| 5 | First drive output element |
| 6 | Second drive output element |
| 7 | Output element |
| 9 | Clutch cage |
| 10 | Rotation fluctuation damper |
| 11.1 | Double clutch transmission |
| 11.2 | Double clutch transmission |
| 11.3 | Double clutch transmission |
| 11.4 | Double clutch transmission |
| 12 | Input shaft |
| 13 | First intermediate shaft |
| 14 | Second intermediate shaft |
| 15 | First countershaft |
| 16 | Second countershaft |
| 17 | Output element, axle differential |
| 18 | Fixed gearwheel |
| 19 | Idler gearwheel |
| 20 | Idler gearwheel |
| 21 | Fixed gearwheel |
| 22 | Idler gearwheel |
| 23 | Idler gearwheel |
| 24 | Fixed gearwheel |

-continued

| | |
|---|---|
| 25 | Fixed gearwheel |
| 26 | Idler gearwheel |
| 27 | Idler gearwheel |
| 28 | Fixed gearwheel |
| 29 | Idler gearwheel |
| 30 | Idler gearwheel |
| 31 | Differential cage |
| 32 | Fixed gearwheel |
| 33 | Idler gearwheel |
| 34 | Idler gearwheel |
| 35 | Fixed gearwheel |
| 36 | Idler gearwheel |
| 37 | Idler gearwheel |
| 38 | Fixed gearwheel |
| 39 | Idler gearwheel |
| 40 | Idler gearwheel |
| 41 | Fixed gearwheel |
| 42 | Idler gearwheel |
| 43 | Idler gearwheel |
| A1-A8 | Transmission ratio steps |
| B1.1 | Output transmission ratio step |
| B1.2 | Output transmission ratio step |
| B2.1 | Output transmission ratio step |
| B2.2 | Output transmission ratio step |
| C | Output constant |
| G1-G16 | Gear steps |
| $i_{A1}$-$i_{A8}$ | Transmission ratios of transmission ratio steps |
| $i_{B1.1}$ | First transmission ratio of the first output transmission ratio step |
| $i_{B1.2}$ | Second transmission ratio of the first output transmission ratio step |
| $i_{B2.1}$ | First transmission ratio of the second output transmission ratio step |
| $i_{B2.2}$ | Second transmission ratio of the second output transmission ratio step |
| $i_C$ | Transmission ratio of an output constant |
| $i_{G1}$-$i_{G16}$ | Overall transmission ratios of gear steps |
| K1 | Power shift element, friction clutch |
| K2 | Power shift element, friction clutch |
| SA1.1 | First shifting packet |
| SA1.2 | Second shifting packet |
| SA2.1 | Third shifting packet |
| SA2.2 | Fourth shifting packet |
| SB1 | Shifting packet |
| SB2 | Shifting packet |
| S1 | Clutch |
| S2 | Clutch |
| S3 | Clutch |
| S4 | Clutch |

The invention claimed is:

1. A power shift parallel shift transmission comprising:
a plurality of parallel torque-transmission branches, each of which is formed on an input side by one of a plurality of intermediate elements (3, 4) each of which is connectable, by an associated power shift element (K1, K2), to a common input element (2) and, on an output side, by one of a plurality of drive output elements (5, 6) each of which is connectable to an appropriate one of the plurality of intermediate elements (3, 4) by a transmission ratio step (A1-A4) engaged by a respective clutch (S1-S4), and the plurality of drive output elements (5, 6) comprising at least first and second drive output elements (5 and 6);
at least the first and the second drive output elements (5, 6) having a driving connection to a common output element (7) such that the transmission ratio steps (A1-A4) are distributed in alternation, in the sequence of their transmission ratios ($i_{A1}$-$i_{A4}$), across the plurality of intermediate elements (3, 4) and in groups of adjacent transmission ratios ($i_{A1}$, $i_{A2}$, $i_{A3}$, $i_{A4}$) across the first and the second drive output elements (5, 6); and at least one of the first and the second drive output elements (5, 6) being in drivingly connected with the common output element (7) via at least a first two alternatively shiftable output transmission ratio steps (B1.1, B1.2; B2.1, B2.2) that have different transmission ratios ($i_{B1.1}$, $i_{B1.2}$; $i_{B2.1}$, $i_{B2.2}$).

2. The parallel shift transmission according to claim 1, wherein the first two alternatively shiftable output transmission ratio steps (B1.1, B1.2) each comprise at least one fixed gearwheel and an idler gearwheel which is in driving connection with the fixed gearwheel and which is engaged by an associated clutch.

3. The parallel shift transmission according to claim 2, wherein the fixed gearwheels of the first two alternatively shiftable output transmission ratio steps (B1.1, B1.2) are arranged in a rotationally fixed manner on the common output element (7) and the idler gearwheels of the first two alternatively shiftable output transmission ratio steps (B1.1, B1.2) are rotatably supported on the associated first or second drive output element (5, 6).

4. The parallel shift transmission according to claim 2, wherein the fixed gearwheels of the first two alternatively shiftable output transmission ratio steps (B1.1, B1.2) are arranged in a rotationally fixed manner on the associated first or second drive output element (5, 6) and the idler gearwheels of the first two alternatively shiftable output transmission ratio steps (B1.1, B1.2) are rotatably supported on the common output element (7) and are connectable thereto.

5. The parallel shift transmission according to claim 2, wherein the clutches of the idler gearwheels of the first two alternatively shiftable output transmission ratio steps (B1.1, B1.2) are combined in a common shifting packet (SB1).

6. The parallel shift transmission according to claim 1, wherein the different transmission ratios ($i_{B1.1}$, $i_{B1.2}$) of the first two alternatively shiftable output transmission ratio steps (B1.1, B1.2) differ to an extent such that overall transmission ratios ($i_{G1}$, $i_{G2}$), effective in combination with an engaged one of the first two alternatively shiftable output transmission ratio steps (B1.1) of the transmission ratio steps (A1, A2) associated with the related drive output element (5), are larger than the overall transmission ratios ($i_{G3}$, $i_{G4}$) of at least a part, corresponding to a number of the intermediate elements (3, 4), of the transmission ratio steps (A3, A4) associated with the other drive output element (6), and the overall transmission ratios ($i_{G5}$, $i_{G6}$) effective in combination with the other engaged one of the first two alternatively shiftable output transmission ratio steps (B1.2) of the transmission ratio steps associated with the related drive output element (5), are smaller than the overall transmission ratios ($i_{G3}$, $i_{G4}$) of the part concerned of the transmission ratio steps (A3, A4) associated with the other drive output element (6).

7. The parallel shift transmission according to claim 1, wherein the parallel shift transmission (1.1) comprises six-gears and the two parallel torque-transmission branches comprise:
 a shiftable first transmission ratio step (A1) comprising an input side drivingly connected with a first of the plurality of intermediate elements (3) and an output side drivingly connected with the first drive output element (5);
 a shiftable third transmission ratio step (A3) comprising an input side drivingly connected with the first of the plurality of intermediate elements (3) and an output side drivingly connected with the second drive output element (6);
 a shiftable second transmission ratio step (A2) comprising an input side drivingly connected with a second of the plurality of intermediate elements (4) and an output side drivingly connected with the first drive output element (5);
 a shiftable fourth transmission ratio step (A4) comprising an input side drivingly connected with the second of the plurality of intermediate elements (4) and an output side drivingly connected with the second drive output element (6); and
 the first drive output element (5) is drivingly connected with the common output element (7) via the first two alternatively shiftable output transmission ratio steps (B1.1, B1.2) and the second drive output element (6) is drivingly connected with the common output element (7) via an output constant (C).

8. The parallel shift transmission according to claim 1, wherein the parallel shift transmission (1.2) comprises eight-gears and the two parallel torque-transmission branches comprise:
 a shiftable first transmission ratio step (A1) comprising an input side drivingly connected with a first of the plurality of intermediate elements (3) and an output side drivingly connected with the first drive output element (5);
 a shiftable third transmission ratio step (A3) comprising an input side drivingly connected with the first of the plurality of intermediate elements (3) and an output side drivingly connected with the second drive output element (6);
 a shiftable second transmission ratio step (A2) comprising an input side drivingly connected with a second of the plurality of intermediate elements (4) and an output side drivingly connected with the first drive output element (5);
 a shiftable fourth transmission ratio step (A4) comprising an input side drivingly connected with the second of the plurality of intermediate elements (4) and an output side drivingly connected with the second drive output element (6); and
 the first drive output element (5) is drivingly connected with the common output element (7), via the first two alternatively shiftable output transmission ratio steps (B1.1, B1.2) and the second drive output element (6) is drivingly connected with the common output element (7) via another two alternatively shiftable output transmission ratio steps (B2.1, B2.2).

9. The parallel shift transmission according to claim 1, wherein the parallel shift transmission (1.3) comprises twelve gears and the two parallel torque-transmission branches comprise:
 shiftable first and third transmission ratio steps (A1, A3), each having an input side drivingly connected to a first of the plurality of intermediate elements (3) and an output side drivingly connected to the first drive output element (5);
 shiftable fifth and shiftable seventh transmission ratio steps (A5, A7), each having an input side drivingly connected to the first of the plurality of intermediate elements (3) and an output side drivingly connected to the second drive output element (6);
 shiftable second and shiftable fourth transmission ratio steps (A2, A4), each having an input side drivingly connected to a second of the plurality of intermediate elements (4) and an output side drivingly connected to the first drive output element (5);
 shiftable sixth and shiftable eighth transmission ratio steps (A6, A8), each having an input side drivingly connected to the second of the plurality of intermediate elements (4) and an output side drivingly connected to the second drive output element (6); and the first drive output element (5) is drivingly connected to the common output element (7) via the first two alternatively shiftable alternatively shiftable output transmission ratio steps (B1.1, B1.2) and the second drive output element (6) is drivingly connected to the common output element (7) via an output constant (C).

10. The parallel shift transmission according to claim 1, wherein the parallel shift transmission (1.1) with the two parallel torque-transmission branches is a double clutch transmission (11.1), the input element (2) is an input shaft (12), the power shift elements are friction clutches (K1, K2), and the intermediate elements (3, 4) are intermediate shafts (13, 14) arranged coaxially with one another, and the first and the second drive output elements (5, 6) are countershafts (15, 16) which are positioned axis-parallel to the intermediate shafts (13, 14).

11. A power shift parallel shift transmission comprising:
a plurality of parallel torque-transmission branches, each of which is formed on an input side by one of a plurality of intermediate elements (3, 4) each of which is connectable, by an associated power shift element (K1, K2), to a common input element (2) and, on an output side, by one of a plurality of drive output elements (5, 6) each of which is connectable to an appropriate one of the plurality of intermediate elements (3, 4) by a transmission ratio step (A1-A4) engaged by a respective clutch (S1-S4), and the plurality of drive output elements (5, 6) comprising at least first and second drive output elements (5 and 6);
at least the first and the second drive output elements (5, 6) having a driving connection to a common output element (7) such that the transmission ratio steps (A1-A4) are distributed in alternation, in the sequence of their transmission ratios ($i_{A1}$-$i_{A4}$), across the plurality of intermediate elements (3, 4) and in groups of adjacent transmission ratios ($i_{A1}$, $i_{A2}$, $i_{A3}$, $i_{A4}$) across the first and the second drive output elements (5, 6);
at least one of the first and the second drive output elements (5, 6) being in driving connection with the common output element (7) via at least a first two alternatively shiftable output transmission ratio steps (B1.1, B1.2) that have different transmission ratios ($i_{B1.1}$, $i_{B1.2}$);
wherein the parallel shift transmission (1.4) comprises sixteen gears and the two parallel torque-transmission branches comprise:
shiftable first and shiftable third transmission ratio steps (A1, A3), each having an input side drivingly connected to a first of the plurality of intermediate elements (3) and an output side drivingly connected to the first drive output element (5);
shiftable fifth and shiftable seventh transmission ratio steps (A5, A7), each having an input side drivingly connected to the first of the plurality of intermediate elements (3) and an output side drivingly connected to the second drive output element (6);
shiftable second and shiftable fourth transmission ratio steps (A2, A4), each having an input side drivingly connected to a second of the plurality of intermediate elements (4) and an output side drivingly connected to the first drive output element (5); and
shiftable sixth and shiftable eighth transmission ratio steps (A6, A8), each having an input side drivingly connected to the second of the plurality of intermediate elements (4) and an output side drivingly connected to the second drive output element (6); and the first drive output element (5) is drivingly connected to the common output element (7) via the first two alternatively shiftable alternatively shiftable output transmission ratio steps (B1.1, B1.2) and the second drive output element (6) is drivingly connected to the common output element (7) via another two alternatively shiftable alternatively shiftable output transmission ratio steps (B2.1, B2.2).

12. A double clutch transmission with two parallel torque-transmission branches, each branch comprising, on an input side, one of first and second intermediate shafts (13, 14) which are connectable to a common input shaft (12) by a respective friction clutch (K1, K2), and, on an output side, one of at least first and second countershafts (15, 16) each being connectable to a respective one of the first and the second intermediate shafts (13, 14) by a transmission ratio step (A1-A4) being engagable by a respective clutch (S1-S4), the first and the second countershafts (15, 16) being drivingly connected to a common output element (17), the first and the second intermediate shafts (13, 14) being arranged coaxially with one another, and the transmission ratio steps (A1-A4) being distributed in alternation in a sequence of their transmission ratios ($i_{A1}$-$i_{A4}$) across the first and the second intermediate shafts (13, 14) and in groups of adjacent transmission ratios ($i_{A1}$, $i_{A2}$, $i_{A3}$, $i_{A4}$) across the first and the second countershafts (15, 16),
wherein at least one of the at least first and the second countershafts (15, 16) is in drivingly connected with the common output element (17) via at least a first two alternatively shiftable output transmission ratio steps (B1.1, B1.2; B2.1, B2.2) that have different transmission ratios ($i_{B1.1}$, $i_{B1.2}$; $i_{B2.1}$, $i_{B2.2}$).

13. The double clutch transmission according to claim 12, wherein the first two alternatively shiftable output transmission ratio steps (B1.1, B1.2; B2.1, B2.2) each comprise at least one fixed gearwheel (25, 28) and an idler gearwheel (26, 29; 27, 30) which is drivingly connected with the fixed gearwheel (25, 28) and engagable, via a respective clutch.

14. The double clutch transmission according to claim 13, wherein the fixed gearwheels (25, 28) of the first two alternatively shiftable output transmission ratio steps (B1.1, B1.2; B2.1, B2.2) are supported on the common output element (17) in a rotationally fixed manner and the idler gearwheels (26, 29; 27, 30), of the first two alternatively shiftable output transmission ratio steps (B1.1, B1.2; B2.1, B2.2), are each rotatably supported on a respective one of the first and the second countershafts (15, 16).

15. The double clutch transmission according to claim 14, wherein gearsets (25, 26, 27; 28, 29, 30) of the first two alternatively shiftable output transmission ratio steps (B1.1, B1.2) and the another two alternatively shiftable output transmission ratio steps (B2.1, B2.2) are arranged in pairs in a common wheel plane, and the common wheel planes each comprise a common fixed gearwheel (25; 28) arranged on the common output element (17).

16. The double clutch transmission according to claim 13, wherein the fixed gearwheels (25, 28) of the first two alternatively shiftable output transmission ratio steps (B1.1, B1.2; B2.1, B2.2) are, in each case, arranged in a rotationally fixed manner on the common output element (17) and the idler gearwheels (26, 29; 27, 30) of the first two alternatively shiftable output transmission ratio steps (B1.1, B1.2; B2.1, B2.2) are, in each case, rotationally supported respectively on one of the first and the second countershaft (15, 16) and are connectable thereto.

17. The double clutch transmission according to claim 13, wherein the clutches of the idler gearwheels (26, 29; 27, 30)

of the first two alternatively shiftable output transmission ratio steps (B1.1, B1.2; B2.1, B2.2) are combined in a common shifting packet (SB1; SB2).

18. The double clutch transmission according to claim 12, wherein the transmission ratios ($i_{B1.1}$, $i_{B1.2}$, $i_{B2.1}$, $i_{B2.2}$) of the first two alternatively shiftable output transmission ratio steps (B1.1, B1.2; B2.1, B2.2) differ to an extent such that overall transmission ratios ($i_{G1}$, $i_{G2}$; $i_{G3}$, $i_{G4}$), effective in combination with an engaged one of the first two alternatively shiftable output transmission ratio steps (B1.1; B2.1) of the transmission ratio steps (A1, A2; A3, A4) associated with the countershaft (15; 16) concerned, are larger than overall transmission ratios ($i_{G3}$, $i_{G4}$; $i_{G5}$, $i_{G6}$) of at least an even-numbered part of the transmission ratio steps (A3, A4; A1, A2) associated with the other countershaft (16; 15), and the overall transmission ratios ($i_{G5}$, $i_{G6}$; $i_{G7}$, $i_{G8}$), effective in combination with the other engaged one of the first two alternatively shiftable output transmission ratio steps (B1.2; B2.2) of the transmission ratio steps (A1, A2; A3, A4) associated with the one of the first and the second countershafts (15; 16) concerned, are smaller than the overall transmission ratios ($i_{G3}$, $i_{G4}$; $i_{G5}$, $i_{G6}$) of the part concerned of the transmission ratio steps (A3, A4; A1, A2) associated with the other of the first and the second countershafts (16; 15).

19. The double clutch transmission according to claim 12, wherein the double clutch transmission (11.1) comprises six gears and is configured such that:
   a shiftable first transmission ratio step (A1) has an input side that connected with a first intermediate shaft (13) and output side drivingly connected with a first countershaft (15);
   a shiftable third transmission ratio step (A3) has an input side drivingly connected with the first intermediate shaft (13) and an output side drivingly connected with a second countershaft (16);
   a shiftable second transmission ratio step (A2) has an input side drivingly connected with a second intermediate shaft (14) and an output side drivingly connected with the first countershaft (15);
   a shiftable fourth transmission ratio step (A4) has an input side drivingly connected with the second intermediate shaft (14) and an output side drivingly connected with the second countershaft (16); and
   the first countershaft (15) is drivingly connected with the common output element (17), via the first two alternatively shiftable output transmission ratio steps (B1.1, B1.2), and the second countershaft (16) is drivingly connected with the common output element (17), via an output constant (C).

20. The double clutch transmission according to claim 19, wherein gearsets (18, 19, 20) of the first transmission ratio step (A1) and of the third transmission ratio step (A3) are arranged in a common gearwheel plane and comprise a common fixed gearwheel (18) arranged on the first intermediate shaft (13).

21. The double clutch transmission according to claim 19, wherein gearsets (21, 22, 23) of the second transmission ratio step (A2) and of the fourth transmission ratio step (A4) are arranged in a common gearwheel plane and comprise a common fixed gearwheel (21) arranged on the second intermediate shaft (14).

22. The double clutch transmission according to claim 12, wherein the double clutch transmission (11.2) comprises eight gears and is configured such that:
   a shiftable first transmission ratio step (A1) has an input side drivingly connected with a first intermediate shaft (13) and an output side drivingly connected with a first countershaft (15);
   a shiftable third transmission ratio step (A3) has an input side drivingly connected with the first intermediate shaft (13) and an output side drivingly connected with a second countershaft (16);
   a shiftable second transmission ratio step (A2) has an input side drivingly connected with a second intermediate shaft (14) and an output side drivingly connected with the first countershaft (15);
   a shiftable fourth transmission ratio step (A4) has an input side drivingly connected with the second intermediate shaft (14) and an output side drivingly connected with the second countershaft (16); and
   the first countershaft (15) is drivingly connected with the common output element (17), via the first two alternatively shiftable output transmission ratio steps (B1.1, B1 and the second countershaft (16) is drivingly connected with the common output element (17) via another two alternatively shiftable output transmission ratio steps (B2.1, B2.2).

23. The double clutch transmission according to claim 12, wherein the double clutch transmission (11.3) comprises twelve gears and is configured such that:
   shiftable first and shiftable third transmission ratio steps (A1, A3) have an input side drivingly connected with a first intermediate shaft (13) and an output side drivingly connected with a first countershaft (15);
   shiftable fifth and shiftable seventh transmission ratio steps (A5, A7) have an input side drivingly connected with the first intermediate shaft (13) and an output side drivingly connected with second countershaft (16);
   shiftable second and shiftable fourth transmission ratio steps (A2, A4) have an input side drivingly connected with the second intermediate shaft (14) and an output side drivingly connected with the first countershaft (15);
   shiftable sixth and shiftable eighth transmission ratio steps (A6, A8) have an input side drivingly connected with the second intermediate shaft (14) and an output side drivingly connected with the second countershaft (16); and
   the first countershaft (15) is drivingly connected with the common output element (17), via the first two alternatively shiftable output transmission ratio steps (B1.1, B1.2), and the second countershaft (16) is drivingly connected with the common output element (17), via an output constant (C).

24. The double clutch transmission according to claim 23, wherein at least one of gearsets (32, 33, 34) of the first transmission ratio step (A1) and the fifth transmission ratio step (A5) and gearsets (35, 36, 37) of the third transmission ratio step (A3) and the seventh transmission ratio step (A7) are arranged in a common wheel plane and comprise a common fixed gearwheel (32; 35) arranged on the first intermediate shaft (13).

25. The double clutch transmission according to claim 23, wherein at least one of the clutches of the first transmission ratio step (A1) and the third transmission ratio step (A3) and the clutches of the fifth transmission ratio step (A5) and the seventh transmission ratio step (A7) are respectively combined in a common shifting packet (SA1.1; SA1.2).

26. The double clutch transmission according to claim 23, wherein at least one of the gearsets (38, 39, 40) of the second transmission ratio step (A2) and the sixth transmission ratio step (A6) and the gearsets (41, 42, 43) of the fourth transmission ratio step (A4) and the eighth transmission ratio step (A8) are respectively arranged in a common wheel plane and comprise a fixed gearwheel (38; 41) arranged on the second intermediate shaft (14).

27. The double clutch transmission according to claim 23, wherein at least one of the clutches of the second transmission ratio step (A2) and the fourth transmission ratio step (A4) and the clutches of the sixth transmission ratio step (A6) and the eighth transmission ratio step (A8) are respectively combined in a common shifting packet (SA2.1; SA2.2).

28. The double clutch transmission according to claim 12, wherein the double clutch transmission (11.4) comprises sixteen gears and is configured such that:
- shiftable first and shiftable third transmission ratio steps (A1, A3) have an input side drivingly connected with a first intermediate shaft (13) and an output side drivingly connected with a first countershaft (15);
- shiftable fifth and shiftable seventh transmission ratio steps (A5, A7) have an input side drivingly connected with the first intermediate shaft (13) and an output side drivingly connected with a second countershaft (16);
- shiftable second and shiftable fourth transmission ratio steps (A2, A4) have an input side drivingly connected with a second intermediate shaft (14) and an output side drivingly connected with the first countershaft (15);
- shiftable sixth and shiftable eighth transmission ratio steps (A6, A8) have an input side drivingly connected with the second intermediate shaft (14) and an output side drivingly connected with the second countershaft (16); and
- the first countershaft (15) is drivingly connected with the common output element (17), via the first two alternatively shiftable output transmission ratio steps (B1.1, B1.2), and the second countershaft (B2.1, B2.2) is drivingly connected with the common output element (17), via another two alternatively shiftable output transmission ratio steps (B2.1, B2.2).

\* \* \* \* \*